(12) United States Patent
Yener et al.

(10) Patent No.: US 10,597,568 B2
(45) Date of Patent: Mar. 24, 2020

(54) SHAPED ABRASIVE PARTICLE INCLUDING DOPANT MATERIAL AND METHOD OF FORMING SAME

(71) Applicant: SAINT-GOBAIN CERAMICS & PLASTICS, INC., Worcester, MA (US)

(72) Inventors: Doruk O. Yener, Bedford, MA (US); Paul Braun, Providence, RI (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 228 days.

(21) Appl. No.: 15/686,674

(22) Filed: Aug. 25, 2017

(65) Prior Publication Data

US 2017/0349797 A1    Dec. 7, 2017

Related U.S. Application Data

(63) Continuation of application No. 14/607,308, filed on Jan. 28, 2015, now Pat. No. 9,771,507.

(Continued)

(51) Int. Cl.
| | |
|---|---|
| *B24D 3/02* | (2006.01) |
| *C09K 3/14* | (2006.01) |
| *C04B 35/01* | (2006.01) |
| *C04B 35/111* | (2006.01) |
| *C04B 35/56* | (2006.01) |

(Continued)

(52) U.S. Cl.
CPC ............ *C09K 3/1436* (2013.01); *C04B 35/01* (2013.01); *C04B 35/1115* (2013.01); *C04B 35/56* (2013.01); *C04B 35/58* (2013.01); *C04B 35/62802* (2013.01); *C04B 2235/3201* (2013.01); *C04B 2235/3205* (2013.01); *C04B 2235/3224* (2013.01); *C04B 2235/3239* (2013.01); *C04B 2235/3244* (2013.01); *C04B 2235/3251* (2013.01); *C04B 2235/3256* (2013.01); *C04B 2235/6021* (2013.01);

(Continued)

(58) Field of Classification Search
USPC .......................................... 51/293, 307, 309
See application file for complete search history.

(56) References Cited

U.S. PATENT DOCUMENTS

| | | |
|---|---|---|
| 345,604 A | 7/1886 | Semper |
| 1,910,444 A | 5/1933 | Nicholson |

(Continued)

FOREIGN PATENT DOCUMENTS

| | | |
|---|---|---|
| CA | 743715 A | 10/1966 |
| CA | 2423788 A1 | 7/2002 |

(Continued)

OTHER PUBLICATIONS

"Investigation of Shaped Abrasive Particles vol. 1: Review of U.S. Pat. No. 6,054,093 Apr. 25, 2000" © Apr. 2011, 5 pages.

(Continued)

*Primary Examiner* — James E McDonough
(74) *Attorney, Agent, or Firm* — Abel Schillinger, LLP; Adrian Lawrence

(57) ABSTRACT

A method of forming a shaped abrasive particle including extruding a mixture into a form, applying a dopant material to an exterior surface of the form, and forming a precursor shaped abrasive particle from the form.

20 Claims, 13 Drawing Sheets

Related U.S. Application Data

(60) Provisional application No. 61/934,103, filed on Jan. 31, 2014.

(51) Int. Cl.
| | | |
|---|---|---|
| *C04B 35/58* | (2006.01) | |
| *C04B 35/628* | (2006.01) | |
| *B24D 3/00* | (2006.01) | |
| *B24D 11/00* | (2006.01) | |
| *B24D 18/00* | (2006.01) | |

(52) U.S. Cl.
CPC ...... *C04B 2235/75* (2013.01); *C04B 2235/94* (2013.01); *C04B 2235/95* (2013.01)

(56) References Cited

U.S. PATENT DOCUMENTS

| | | |
|---|---|---|
| 2,036,903 A | 4/1936 | Webster |
| 2,049,874 A | 8/1936 | Sherk |
| 2,148,400 A | 2/1939 | Crompton, Jr. |
| 2,248,064 A | 7/1941 | Carlton et al. |
| 2,248,990 A | 7/1941 | Heany |
| 2,290,877 A | 7/1942 | Heany |
| 2,318,360 A | 5/1943 | Benner et al. |
| 2,376,343 A | 5/1945 | Carlton |
| 2,563,650 A | 8/1951 | Heinemann et al. |
| 2,880,080 A | 3/1959 | Rankin et al. |
| 3,041,156 A | 6/1962 | Rowse et al. |
| 3,067,551 A | 12/1962 | Maginnis |
| 3,079,242 A | 2/1963 | Glasgow |
| 3,079,243 A | 2/1963 | Ueltz |
| 3,123,948 A | 3/1964 | Kistler et al. |
| 3,141,271 A | 7/1964 | Fischer et al. |
| 3,276,852 A | 10/1966 | Lemelson |
| 3,377,660 A | 4/1968 | Marshall et al. |
| 3,379,543 A | 4/1968 | Norwalk |
| 3,387,957 A | 6/1968 | Howard |
| 3,454,385 A | 7/1969 | Amero |
| 3,477,180 A | 11/1969 | Robertson, Jr. |
| 3,480,395 A | 11/1969 | McMullen et al. |
| 3,481,723 A | 12/1969 | Kistler et al. |
| 3,491,492 A | 1/1970 | Ueltz |
| 3,495,359 A | 2/1970 | Smith et al. |
| 3,536,005 A | 10/1970 | Derrickson |
| 3,590,799 A | 7/1971 | Guuchowicz |
| 3,608,050 A | 9/1971 | Carman et al. |
| 3,608,134 A | 9/1971 | Cook |
| 3,615,308 A | 10/1971 | Amero |
| 3,619,151 A | 11/1971 | Sheets, Jr. et al. |
| 3,637,360 A | 1/1972 | Ueltz |
| 3,670,467 A | 6/1972 | Walker |
| 3,672,934 A | 6/1972 | Larry |
| 3,819,785 A | 6/1974 | Argyle et al. |
| 3,859,407 A | 1/1975 | Blanding et al. |
| 3,874,856 A | 4/1975 | Leeds |
| 3,909,991 A | 10/1975 | Coes, Jr. |
| 3,940,276 A | 2/1976 | Wilson |
| 3,950,148 A | 4/1976 | Fukuda |
| 3,960,577 A | 6/1976 | Prochazka |
| 3,977,132 A | 8/1976 | Sekigawa |
| 3,986,885 A | 10/1976 | Lankard |
| 3,991,527 A | 11/1976 | Maran |
| 4,004,934 A | 1/1977 | Prochazka |
| 4,037,367 A | 7/1977 | Kruse |
| 4,045,919 A | 9/1977 | Moritomo |
| 4,055,451 A | 10/1977 | Cockbain et al. |
| 4,073,096 A | 2/1978 | Ueltz et al. |
| 4,114,322 A | 9/1978 | Greenspan |
| 4,150,078 A | 4/1979 | Miller et al. |
| 4,194,887 A | 3/1980 | Ueltz et al. |
| 4,252,544 A | 2/1981 | Takahashi |
| 4,261,706 A | 4/1981 | Blanding et al. |
| 4,286,905 A | 9/1981 | Samanta |
| 4,304,576 A | 12/1981 | Hattori et al. |
| 4,314,827 A | 2/1982 | Leitheiser et al. |
| 4,341,663 A | 7/1982 | Derleth et al. |
| 4,393,021 A | 7/1983 | Eisenberg et al. |
| 4,452,911 A | 6/1984 | Eccles et al. |
| 4,457,767 A | 7/1984 | Poon et al. |
| 4,469,758 A | 9/1984 | Scott |
| 4,505,720 A | 3/1985 | Gabor et al. |
| 4,541,842 A | 7/1985 | Rostoker |
| 4,548,617 A | 10/1985 | Miyatani et al. |
| 4,570,048 A | 2/1986 | Poole |
| 4,618,349 A | 10/1986 | Hashimoto et al. |
| 4,623,364 A | 11/1986 | Cottringer et al. |
| 4,656,330 A | 4/1987 | Poole |
| 4,657,754 A | 4/1987 | Bauer et al. |
| 4,659,341 A | 4/1987 | Ludwig et al. |
| 4,678,560 A | 7/1987 | Stole et al. |
| 4,711,750 A | 12/1987 | Scott |
| 4,728,043 A | 3/1988 | Ersdal et al. |
| 4,744,802 A | 5/1988 | Schwabel |
| 4,770,671 A | 9/1988 | Monroe |
| 4,786,292 A | 11/1988 | Janz et al. |
| 4,797,139 A | 1/1989 | Bauer |
| 4,797,269 A | 1/1989 | Bauer et al. |
| 4,799,939 A | 1/1989 | Bloecher et al. |
| 4,829,027 A | 5/1989 | Cutler et al. |
| 4,832,706 A | 5/1989 | Yates |
| 4,848,041 A | 7/1989 | Kruschke |
| 4,858,527 A | 8/1989 | Masanao |
| 4,863,573 A | 9/1989 | Moore et al. |
| 4,876,226 A | 10/1989 | Fuentes |
| 4,881,951 A | 11/1989 | Wood et al. |
| 4,917,852 A | 4/1990 | Poole et al. |
| 4,918,116 A | 4/1990 | Gardziella et al. |
| 4,925,815 A | 5/1990 | Tani et al. |
| 4,930,266 A | 6/1990 | Calhoun et al. |
| 4,942,011 A | 7/1990 | Bolt et al. |
| 4,954,462 A | 9/1990 | Wood |
| 4,960,441 A | 10/1990 | Pellow et al. |
| 4,961,757 A | 10/1990 | Rhodes et al. |
| 4,963,012 A | 10/1990 | Tracy |
| 4,964,883 A | 10/1990 | Morris et al. |
| 4,970,057 A | 11/1990 | Wilkens et al. |
| 4,997,461 A | 3/1991 | Markhoff-Matheny et al. |
| 5,009,675 A | 4/1991 | Kunz et al. |
| 5,009,676 A | 4/1991 | Rue et al. |
| 5,011,508 A | 4/1991 | Wald et al. |
| 5,011,510 A | 4/1991 | Hayakawa et al. |
| 5,014,468 A | 5/1991 | Ravipati et al. |
| 5,024,795 A | 6/1991 | Kennedy et al. |
| 5,032,304 A | 7/1991 | Toyota |
| 5,035,723 A | 7/1991 | Kalinowski et al. |
| 5,035,724 A | 7/1991 | Pukari et al. |
| 5,042,991 A | 8/1991 | Kunz et al. |
| 5,049,166 A | 9/1991 | Kirkendall |
| 5,049,645 A | 9/1991 | Nagaoka et al. |
| 5,053,367 A | 10/1991 | Newkirk et al. |
| 5,053,369 A | 10/1991 | Winkler et al. |
| 5,076,991 A | 12/1991 | Poole et al. |
| 5,078,753 A | 1/1992 | Broberg et al. |
| 5,081,082 A | 1/1992 | Hai-Doo et al. |
| 5,085,671 A | 2/1992 | Martin et al. |
| 5,090,968 A | 2/1992 | Pellow |
| 5,094,986 A | 3/1992 | Matsumoto et al. |
| 5,098,740 A | 3/1992 | Tewari |
| 5,103,598 A | 4/1992 | Kelly |
| 5,108,963 A | 4/1992 | Fu et al. |
| 5,114,438 A | 5/1992 | Leatherman et al. |
| 5,120,327 A | 6/1992 | Dennis |
| 5,123,935 A | 6/1992 | Kanamaru et al. |
| 5,129,919 A | 7/1992 | Kalinowski et al. |
| 5,131,926 A | 7/1992 | Rostoker et al. |
| 5,132,984 A | 7/1992 | Simpson |
| 5,139,978 A | 8/1992 | Wood |
| 5,152,917 A | 10/1992 | Pieper et al. |
| 5,160,509 A | 11/1992 | Carman et al. |
| 5,164,744 A | 11/1992 | Yoshida et al. |
| 5,173,457 A | 12/1992 | Shorthouse |
| 5,178,849 A | 1/1993 | Bauer |
| 5,180,630 A | 1/1993 | Giglia |

(56) References Cited

U.S. PATENT DOCUMENTS

| | | |
|---|---|---|
| 5,185,012 A | 2/1993 | Kelly |
| 5,185,299 A | 2/1993 | Wood et al. |
| 5,190,568 A | 3/1993 | Tselesin |
| 5,194,072 A | 3/1993 | Rue et al. |
| 5,201,916 A | 4/1993 | Berg et al. |
| 5,203,886 A | 4/1993 | Sheldon et al. |
| 5,213,591 A | 5/1993 | Celikkaya et al. |
| 5,215,552 A | 6/1993 | Sung |
| 5,219,462 A | 6/1993 | Bruxvoort et al. |
| 5,219,806 A | 6/1993 | Wood |
| 5,221,294 A | 6/1993 | Carman et al. |
| 5,224,970 A | 7/1993 | Harakawa et al. |
| 5,227,104 A | 7/1993 | Bauer |
| 5,244,477 A | 9/1993 | Rue et al. |
| 5,244,849 A | 9/1993 | Roy et al. |
| 5,273,558 A | 12/1993 | Nelson et al. |
| 5,277,702 A | 1/1994 | Thibault et al. |
| 5,282,875 A | 2/1994 | Wood |
| 5,288,297 A | 2/1994 | Ringwood |
| 5,300,130 A | 4/1994 | Rostoker |
| 5,304,331 A | 4/1994 | Leonard et al. |
| 5,312,789 A | 5/1994 | Wood |
| 5,312,791 A | 5/1994 | Coblenz et al. |
| 5,314,513 A | 5/1994 | Miller et al. |
| 5,366,523 A | 11/1994 | Rowenhorst et al. |
| 5,366,525 A | 11/1994 | Fujiyama |
| 5,372,620 A | 12/1994 | Rowse et al. |
| 5,373,786 A | 12/1994 | Umaba |
| 5,376,598 A | 12/1994 | Preedy et al. |
| 5,376,602 A | 12/1994 | Nilsen |
| 5,383,945 A | 1/1995 | Cottringer et al. |
| 5,395,407 A | 3/1995 | Cottringer et al. |
| 5,409,645 A | 4/1995 | Torre, Jr. et al. |
| 5,429,648 A | 7/1995 | Wu |
| 5,431,967 A | 7/1995 | Manthiram |
| 5,435,816 A | 7/1995 | Spurgeon et al. |
| 5,437,754 A | 8/1995 | Calhoun |
| 5,441,549 A | 8/1995 | Helmin |
| 5,443,603 A | 8/1995 | Kirkendall |
| 5,447,894 A | 9/1995 | Yasuoka et al. |
| 5,453,106 A | 9/1995 | Roberts |
| 5,454,844 A | 10/1995 | Hibbard et al. |
| 5,470,806 A | 11/1995 | Krstic et al. |
| 5,479,873 A | 1/1996 | Shintani et al. |
| 5,482,756 A | 1/1996 | Berger et al. |
| 5,486,496 A | 1/1996 | Talbert et al. |
| 5,496,386 A | 3/1996 | Broberg et al. |
| 5,500,273 A | 3/1996 | Holmes et al. |
| 5,514,631 A | 5/1996 | Cottringer et al. |
| 5,516,347 A | 5/1996 | Garg |
| 5,516,348 A | 5/1996 | Conwell et al. |
| 5,523,074 A | 6/1996 | Takahashi et al. |
| 5,525,100 A | 6/1996 | Kelly et al. |
| 5,527,369 A | 6/1996 | Garg |
| 5,543,368 A | 8/1996 | Talbert et al. |
| 5,549,962 A | 8/1996 | Holmes et al. |
| 5,551,963 A | 9/1996 | Larmie |
| 5,560,745 A | 10/1996 | Roberts |
| 5,567,150 A | 10/1996 | Conwell et al. |
| 5,567,214 A | 10/1996 | Ashley |
| 5,567,251 A | 10/1996 | Peker et al. |
| 5,571,297 A | 11/1996 | Swei et al. |
| 5,576,409 A | 11/1996 | Mackey |
| 5,578,095 A | 11/1996 | Bland et al. |
| 5,578,222 A | 11/1996 | Trischuk et al. |
| 5,582,625 A | 12/1996 | Wright et al. |
| 5,584,896 A | 12/1996 | Broberg et al. |
| 5,584,897 A | 12/1996 | Christianson et al. |
| 5,591,685 A | 1/1997 | Mitomo et al. |
| 5,593,468 A | 1/1997 | Khaund et al. |
| 5,599,493 A | 2/1997 | Ito et al. |
| 5,603,738 A | 2/1997 | Zeiringer et al. |
| 5,609,706 A | 3/1997 | Benedict et al. |
| 5,611,829 A | 3/1997 | Monroe et al. |
| 5,618,221 A | 4/1997 | Furukawa et al. |
| 5,628,952 A | 5/1997 | Holmes et al. |
| 5,641,469 A | 6/1997 | Garg et al. |
| RE35,570 E | 7/1997 | Rowenhorst et al. |
| 5,645,619 A | 7/1997 | Erickson et al. |
| 5,651,925 A | 7/1997 | Ashley et al. |
| 5,656,217 A | 8/1997 | Rogers et al. |
| 5,667,542 A | 9/1997 | Law et al. |
| 5,669,941 A | 9/1997 | Peterson |
| 5,669,943 A | 9/1997 | Horton et al. |
| 5,672,097 A | 9/1997 | Hoopman |
| 5,672,554 A | 9/1997 | Mohri et al. |
| 5,683,844 A | 11/1997 | Mammino |
| 5,702,811 A | 12/1997 | Ho et al. |
| 5,725,162 A | 3/1998 | Garg et al. |
| 5,736,619 A | 4/1998 | Kane et al. |
| 5,738,696 A | 4/1998 | Wu |
| 5,738,697 A | 4/1998 | Wu et al. |
| 5,751,313 A | 5/1998 | Miyashita et al. |
| 5,759,481 A | 6/1998 | Pujari et al. |
| 5,776,214 A | 7/1998 | Wood |
| 5,779,743 A | 7/1998 | Wood |
| 5,785,722 A | 7/1998 | Garg et al. |
| 5,810,587 A | 9/1998 | Bruns et al. |
| 5,820,450 A | 10/1998 | Calhoun |
| 5,830,248 A | 11/1998 | Christianson et al. |
| 5,840,089 A | 11/1998 | Chesley et al. |
| 5,849,646 A | 12/1998 | Stout et al. |
| 5,855,997 A | 1/1999 | Amateau |
| 5,863,306 A | 1/1999 | Wei et al. |
| 5,866,254 A | 2/1999 | Peker et al. |
| 5,876,793 A | 3/1999 | Sherman et al. |
| 5,885,311 A | 3/1999 | McCutcheon et al. |
| 5,893,935 A | 4/1999 | Wood |
| 5,902,647 A | 5/1999 | Venkataramani |
| 5,908,477 A | 6/1999 | Harmer et al. |
| 5,908,478 A | 6/1999 | Wood |
| 5,919,549 A | 7/1999 | Van et al. |
| 5,924,917 A | 7/1999 | Benedict et al. |
| 5,946,991 A | 9/1999 | Hoopman |
| 5,975,987 A | 11/1999 | Hoopman et al. |
| 5,980,678 A | 11/1999 | Tselesin |
| 5,984,988 A | 11/1999 | Berg et al. |
| 5,989,301 A | 11/1999 | Laconto, Sr. et al. |
| 5,997,597 A | 12/1999 | Hagan |
| 6,016,660 A | 1/2000 | Abramshe |
| 6,019,805 A | 2/2000 | Herron |
| 6,024,824 A | 2/2000 | Krech |
| 6,027,326 A | 2/2000 | Cesarano, III et al. |
| 6,048,577 A | 4/2000 | Garg |
| 6,053,956 A | 4/2000 | Wood |
| 6,054,093 A | 4/2000 | Torre, Jr. et al. |
| 6,080,215 A | 6/2000 | Stubbs et al. |
| 6,080,216 A | 6/2000 | Erickson |
| 6,083,622 A | 7/2000 | Garg et al. |
| 6,096,107 A | 8/2000 | Caracostas et al. |
| 6,110,241 A | 8/2000 | Sung |
| 6,129,540 A | 10/2000 | Hoopman et al. |
| 6,136,288 A | 10/2000 | Bauer et al. |
| 6,146,247 A | 11/2000 | Nokubi et al. |
| 6,179,887 B1 | 1/2001 | Barber, Jr. et al. |
| 6,206,942 B1 | 3/2001 | Wood |
| 6,228,134 B1 | 5/2001 | Erickson |
| 6,238,450 B1 | 5/2001 | Garg et al. |
| 6,258,137 B1 | 7/2001 | Garg et al. |
| 6,258,141 B1 | 7/2001 | Sung et al. |
| 6,261,682 B1 | 7/2001 | Law |
| 6,264,710 B1 | 7/2001 | Erickson |
| 6,277,160 B1 | 8/2001 | Stubbs et al. |
| 6,277,161 B1 | 8/2001 | Castro et al. |
| 6,283,997 B1 | 9/2001 | Garg et al. |
| 6,284,690 B1 | 9/2001 | Nakahata et al. |
| 6,287,353 B1 | 9/2001 | Celikkaya |
| 6,306,007 B1 | 10/2001 | Mori et al. |
| 6,312,324 B1 | 11/2001 | Mitsui et al. |
| 6,319,108 B1 | 11/2001 | Adefris et al. |
| 6,331,343 B1 | 12/2001 | Perez et al. |
| 6,371,842 B1 | 4/2002 | Romero |
| 6,391,812 B1 | 5/2002 | Araki et al. |
| 6,401,795 B1 | 6/2002 | Cesarano, III et al. |

(56) References Cited

U.S. PATENT DOCUMENTS

| | | |
|---|---|---|
| 6,403,001 B1 | 6/2002 | Hayashi |
| 6,413,286 B1 | 7/2002 | Swei et al. |
| 6,451,076 B1 | 9/2002 | Nevoret et al. |
| 6,475,253 B2 | 11/2002 | Culler et al. |
| 6,524,681 B1 | 2/2003 | Seitz et al. |
| 6,531,423 B1 | 3/2003 | Schwetz et al. |
| 6,537,140 B1 | 3/2003 | Miller et al. |
| 6,579,819 B2 | 6/2003 | Hirosaki et al. |
| 6,582,623 B1 | 6/2003 | Grumbine et al. |
| 6,583,080 B1 | 6/2003 | Rosenflanz |
| 6,599,177 B2 | 7/2003 | Nevoret et al. |
| 6,646,019 B2 | 11/2003 | Perez et al. |
| 6,652,361 B1 | 11/2003 | Gash et al. |
| 6,669,745 B2 | 12/2003 | Prichard et al. |
| 6,685,755 B2 | 2/2004 | Ramanath et al. |
| 6,696,258 B1 | 2/2004 | Wei |
| 6,702,650 B2 | 3/2004 | Adefris |
| 6,737,378 B2 | 5/2004 | Hirosaki et al. |
| 6,749,496 B2 | 6/2004 | Mota et al. |
| 6,755,729 B2 | 6/2004 | Ramanath et al. |
| 6,821,196 B2 | 11/2004 | Oliver |
| 6,833,014 B2 | 12/2004 | Welygan et al. |
| 6,843,815 B1 | 1/2005 | Thurber et al. |
| 6,846,795 B2 | 1/2005 | Lant et al. |
| 6,878,456 B2 | 4/2005 | Castro et al. |
| 6,881,483 B2 | 4/2005 | McArdle et al. |
| 6,888,360 B1 | 5/2005 | Connell et al. |
| 6,913,824 B2 | 7/2005 | Culler et al. |
| 6,942,561 B2 | 9/2005 | Mota et al. |
| 6,949,128 B2 | 9/2005 | Annen |
| 6,974,930 B2 | 12/2005 | Jense |
| 7,022,179 B1 | 4/2006 | Dry |
| 7,044,989 B2 | 5/2006 | Welygan et al. |
| 7,141,522 B2 | 11/2006 | Rosenflanz et al. |
| 7,168,267 B2 | 1/2007 | Rosenflanz et al. |
| 7,169,198 B2 | 1/2007 | Moeltgen et al. |
| 7,267,700 B2 | 9/2007 | Collins et al. |
| 7,294,158 B2 | 11/2007 | Welygan et al. |
| 7,297,170 B2 | 11/2007 | Welygan et al. |
| 7,297,402 B2 | 11/2007 | Evans et al. |
| 7,364,788 B2 | 4/2008 | Kishbaugh et al. |
| 7,373,887 B2 | 5/2008 | Jackson |
| 7,384,437 B2 | 6/2008 | Welygan et al. |
| 7,488,544 B2 | 2/2009 | Schofalvi et al. |
| 7,507,268 B2 | 3/2009 | Rosenflanz |
| 7,553,346 B2 | 6/2009 | Welygan et al. |
| 7,556,558 B2 | 7/2009 | Palmgren |
| 7,560,062 B2 | 7/2009 | Gould et al. |
| 7,560,139 B2 | 7/2009 | Thebault et al. |
| 7,563,293 B2 | 7/2009 | Rosenflanz |
| 7,611,795 B2 | 11/2009 | Aoyama et al. |
| 7,618,684 B2 | 11/2009 | Nesbitt |
| 7,662,735 B2 | 2/2010 | Rosenflanz et al. |
| 7,666,344 B2 | 2/2010 | Schofalvi et al. |
| 7,666,475 B2 | 2/2010 | Morrison |
| 7,669,658 B2 | 3/2010 | Barron et al. |
| 7,670,679 B2 | 3/2010 | Krishna et al. |
| 7,695,542 B2 | 4/2010 | Drivdahl et al. |
| 7,858,189 B2 | 12/2010 | Wagener et al. |
| 7,906,057 B2 | 3/2011 | Zhang et al. |
| 7,968,147 B2 | 6/2011 | Fang et al. |
| 7,972,430 B2 | 7/2011 | Millard et al. |
| 8,021,449 B2 | 9/2011 | Seth et al. |
| 8,034,137 B2 | 10/2011 | Erickson et al. |
| 8,049,136 B2 | 11/2011 | Mase et al. |
| 8,070,556 B2 | 12/2011 | Kumar et al. |
| 8,123,828 B2 | 2/2012 | Culler et al. |
| 8,141,484 B2 | 3/2012 | Ojima et al. |
| 8,142,531 B2 | 3/2012 | Adefris et al. |
| 8,142,532 B2 | 3/2012 | Erickson et al. |
| 8,142,891 B2 | 3/2012 | Culler et al. |
| 8,251,774 B2 | 8/2012 | Joseph et al. |
| 8,256,091 B2 | 9/2012 | Duescher |
| 8,440,602 B2 | 5/2013 | Gonzales et al. |
| 8,440,603 B2 | 5/2013 | Gonzales et al. |
| 8,445,422 B2 | 5/2013 | Gonzales et al. |
| 8,470,759 B2 | 6/2013 | Gonzales et al. |
| 8,480,772 B2 | 7/2013 | Welygan et al. |
| 8,628,597 B2 | 1/2014 | Palmgren et al. |
| 8,783,589 B2 | 7/2014 | Hart et al. |
| 8,852,643 B2 | 10/2014 | Gonzales et al. |
| 9,017,439 B2 | 4/2015 | Yener et al. |
| 2001/0027623 A1 | 10/2001 | Rosenflanz |
| 2002/0026752 A1 | 3/2002 | Culler et al. |
| 2002/0068518 A1 | 6/2002 | Cesena et al. |
| 2002/0151265 A1 | 10/2002 | Adefris |
| 2002/0170236 A1 | 11/2002 | Larson et al. |
| 2002/0174935 A1 | 11/2002 | Burdon et al. |
| 2002/0177391 A1 | 11/2002 | Fritz et al. |
| 2003/0008933 A1 | 1/2003 | Perez et al. |
| 2003/0022961 A1 | 1/2003 | Kusaka et al. |
| 2003/0029094 A1 | 2/2003 | Moeltgen et al. |
| 2003/0085204 A1 | 5/2003 | Lagos |
| 2003/0109371 A1 | 6/2003 | Pujari et al. |
| 2003/0110707 A1 | 6/2003 | Rosenflanz et al. |
| 2003/0126800 A1 | 7/2003 | Seth et al. |
| 2004/0003895 A1 | 1/2004 | Amano et al. |
| 2004/0148868 A1 | 8/2004 | Anderson et al. |
| 2004/0148967 A1 | 8/2004 | Celikkaya et al. |
| 2004/0202844 A1 | 10/2004 | Wong |
| 2004/0224125 A1 | 11/2004 | Yamada et al. |
| 2004/0235406 A1 | 11/2004 | Duescher |
| 2004/0244675 A1 | 12/2004 | Kishimoto et al. |
| 2005/0020190 A1 | 1/2005 | Schutz et al. |
| 2005/0060941 A1 | 3/2005 | Provow et al. |
| 2005/0060947 A1 | 3/2005 | McArdle et al. |
| 2005/0064805 A1 | 3/2005 | Culler et al. |
| 2005/0081455 A1 | 4/2005 | Welygan et al. |
| 2005/0118939 A1 | 6/2005 | Duescher |
| 2005/0132655 A1 | 6/2005 | Anderson et al. |
| 2005/0218565 A1 | 10/2005 | DiChiara, Jr. |
| 2005/0223649 A1 | 10/2005 | O'Gary et al. |
| 2005/0232853 A1 | 10/2005 | Evans et al. |
| 2005/0245179 A1 | 11/2005 | Luedeke |
| 2005/0255801 A1 | 11/2005 | Pollasky |
| 2005/0266221 A1 | 12/2005 | Karam et al. |
| 2005/0271795 A1 | 12/2005 | Moini et al. |
| 2005/0284029 A1 | 12/2005 | Bourlier et al. |
| 2006/0049540 A1 | 3/2006 | Hui et al. |
| 2006/0126265 A1 | 6/2006 | Crespi et al. |
| 2006/0135050 A1 | 6/2006 | Petersen et al. |
| 2006/0177488 A1 | 8/2006 | Caruso et al. |
| 2006/0185256 A1 | 8/2006 | Nevoret et al. |
| 2007/0020457 A1 | 1/2007 | Adefris |
| 2007/0051355 A1 | 3/2007 | Sung |
| 2007/0072527 A1 | 3/2007 | Palmgren |
| 2007/0074456 A1 | 4/2007 | Orlhac et al. |
| 2007/0087928 A1 | 4/2007 | Rosenflanz et al. |
| 2007/0234646 A1 | 10/2007 | Can et al. |
| 2008/0017053 A1 | 1/2008 | Araumi et al. |
| 2008/0121124 A1 | 5/2008 | Sato |
| 2008/0172951 A1 | 7/2008 | Starling |
| 2008/0176075 A1 | 7/2008 | Bauer et al. |
| 2008/0179783 A1 | 7/2008 | Liu et al. |
| 2008/0230951 A1 | 9/2008 | Dannoux et al. |
| 2008/0262577 A1 | 10/2008 | Altshuler et al. |
| 2008/0286590 A1 | 11/2008 | Besida et al. |
| 2008/0299875 A1 | 12/2008 | Duescher |
| 2009/0016916 A1 | 1/2009 | Rosenzweig et al. |
| 2009/0017736 A1 | 1/2009 | Block et al. |
| 2009/0165394 A1 | 7/2009 | Culler et al. |
| 2009/0165661 A1 | 7/2009 | Koenig et al. |
| 2009/0208734 A1 | 8/2009 | Macfie et al. |
| 2009/0246464 A1 | 10/2009 | Watanabe et al. |
| 2010/0000159 A1 | 1/2010 | Walia et al. |
| 2010/0003900 A1 | 1/2010 | Sakaguchi et al. |
| 2010/0003904 A1 | 1/2010 | Duescher |
| 2010/0040767 A1 | 2/2010 | Uibel et al. |
| 2010/0056816 A1 | 3/2010 | Wallin et al. |
| 2010/0068974 A1 | 3/2010 | Dumm |
| 2010/0146867 A1 | 6/2010 | Boden et al. |
| 2010/0151195 A1 | 6/2010 | Culler et al. |
| 2010/0151196 A1 | 6/2010 | Adefris et al. |
| 2010/0151201 A1 | 6/2010 | Erickson et al. |

(56) References Cited

U.S. PATENT DOCUMENTS

| | | |
|---|---|---|
| 2010/0190424 A1 | 7/2010 | Francois et al. |
| 2010/0201018 A1 | 8/2010 | Yoshioka et al. |
| 2010/0251625 A1 | 10/2010 | Gaeta |
| 2010/0292428 A1 | 11/2010 | Meador et al. |
| 2010/0307067 A1 | 12/2010 | Sigalas et al. |
| 2010/0319269 A1 | 12/2010 | Erickson |
| 2011/0008604 A1 | 1/2011 | Boylan |
| 2011/0111563 A1 | 5/2011 | Yanagi et al. |
| 2011/0124483 A1 | 5/2011 | Shah et al. |
| 2011/0136659 A1 | 6/2011 | Allen et al. |
| 2011/0146509 A1 | 6/2011 | Welygan et al. |
| 2011/0160104 A1 | 6/2011 | Wu et al. |
| 2011/0244769 A1 | 10/2011 | David et al. |
| 2011/0289854 A1 | 12/2011 | Moren et al. |
| 2011/0314746 A1 | 12/2011 | Erickson et al. |
| 2012/0000135 A1 | 1/2012 | Eilers et al. |
| 2012/0034847 A1 | 2/2012 | Besse et al. |
| 2012/0055098 A1 | 3/2012 | Ramanath et al. |
| 2012/0137597 A1 | 6/2012 | Adefris et al. |
| 2012/0144754 A1 | 6/2012 | Culler et al. |
| 2012/0144755 A1 | 6/2012 | Erickson et al. |
| 2012/0153547 A1 | 6/2012 | Bauer et al. |
| 2012/0167481 A1 | 7/2012 | Yener et al. |
| 2012/0168979 A1 | 7/2012 | Bauer et al. |
| 2012/0227333 A1 | 9/2012 | Adefris et al. |
| 2012/0231711 A1* | 9/2012 | Keipert ............... B24D 11/001 451/534 |
| 2012/0308837 A1 | 12/2012 | Schlechtriemen et al. |
| 2013/0000212 A1 | 1/2013 | Wang et al. |
| 2013/0000216 A1 | 1/2013 | Wang et al. |
| 2013/0009484 A1 | 1/2013 | Yu |
| 2013/0036402 A1 | 2/2013 | Mutisya et al. |
| 2013/0045251 A1 | 2/2013 | Cen et al. |
| 2013/0067669 A1 | 3/2013 | Gonzales et al. |
| 2013/0072417 A1 | 3/2013 | Perez-Prat et al. |
| 2013/0074418 A1 | 3/2013 | Panzarella et al. |
| 2013/0125477 A1 | 5/2013 | Adefris |
| 2013/0180180 A1* | 7/2013 | Yener ................... C09K 3/1436 51/309 |
| 2013/0186005 A1 | 7/2013 | Kavanaugh |
| 2013/0186006 A1 | 7/2013 | Kavanaugh et al. |
| 2013/0199105 A1 | 8/2013 | Braun et al. |
| 2013/0203328 A1 | 8/2013 | Givot et al. |
| 2013/0236725 A1 | 9/2013 | Yener et al. |
| 2013/0255162 A1 | 10/2013 | Welygan et al. |
| 2013/0267150 A1 | 10/2013 | Seider et al. |
| 2013/0283705 A1 | 10/2013 | Fischer et al. |
| 2013/0305614 A1 | 11/2013 | Gaeta et al. |
| 2013/0337262 A1 | 12/2013 | Bauer et al. |
| 2013/0337725 A1 | 12/2013 | Monroe |
| 2013/0344786 A1 | 12/2013 | Keipert |
| 2014/0000176 A1 | 1/2014 | Moren et al. |
| 2014/0007518 A1 | 1/2014 | Yener et al. |
| 2014/0080393 A1 | 3/2014 | Ludwig |
| 2014/0106126 A1 | 4/2014 | Gaeta et al. |
| 2014/0182216 A1 | 7/2014 | Panzarella et al. |
| 2014/0182217 A1 | 7/2014 | Yener et al. |
| 2014/0186585 A1 | 7/2014 | Field, III et al. |
| 2014/0250797 A1 | 9/2014 | Yener et al. |
| 2014/0290147 A1 | 10/2014 | Seth et al. |
| 2014/0352721 A1 | 12/2014 | Gonzales et al. |
| 2014/0352722 A1 | 12/2014 | Gonzales et al. |
| 2014/0357544 A1 | 12/2014 | Gonzales et al. |
| 2014/0378036 A1 | 12/2014 | Cichowlas et al. |
| 2015/0000209 A1 | 1/2015 | Louapre et al. |
| 2015/0000210 A1 | 1/2015 | Breder et al. |
| 2015/0007399 A1 | 1/2015 | Gonzales et al. |
| 2015/0007400 A1 | 1/2015 | Gonzales et al. |
| 2015/0089881 A1 | 4/2015 | Stevenson et al. |
| 2015/0126098 A1 | 5/2015 | Eilers et al. |
| 2015/0128505 A1 | 5/2015 | Wang et al. |
| 2015/0183089 A1 | 7/2015 | Iyengar et al. |
| 2015/0218430 A1 | 8/2015 | Yener et al. |
| 2015/0232727 A1 | 8/2015 | Erickson |
| 2015/0291865 A1 | 10/2015 | Breder et al. |
| 2015/0291866 A1 | 10/2015 | Arcona et al. |
| 2015/0291867 A1 | 10/2015 | Breder et al. |
| 2015/0343603 A1 | 12/2015 | Breder et al. |
| 2016/0177152 A1 | 6/2016 | Braun |
| 2016/0177153 A1 | 6/2016 | Josseaux |
| 2016/0177154 A1 | 6/2016 | Josseaux et al. |
| 2016/0186028 A1 | 6/2016 | Louapare et al. |
| 2016/0214903 A1 | 7/2016 | Humpal et al. |
| 2016/0298013 A1 | 10/2016 | Bock et al. |
| 2016/0303704 A1 | 10/2016 | Chou et al. |
| 2016/0303705 A1 | 10/2016 | Chou et al. |
| 2016/0304760 A1 | 10/2016 | Bock et al. |
| 2016/0311081 A1 | 10/2016 | Culler et al. |
| 2016/0311084 A1 | 10/2016 | Culler et al. |
| 2016/0326416 A1 | 11/2016 | Bauer et al. |
| 2016/0340564 A1 | 11/2016 | Louapre et al. |
| 2016/0354898 A1 | 12/2016 | Nienaber et al. |
| 2016/0362589 A1 | 12/2016 | Bauer et al. |
| 2017/0066099 A1 | 3/2017 | Nakamura |
| 2017/0114260 A1 | 4/2017 | Bock et al. |
| 2017/0129075 A1 | 5/2017 | Thurber et al. |
| 2018/0086957 A1 | 3/2018 | Sahlin et al. |

FOREIGN PATENT DOCUMENTS

| | | |
|---|---|---|
| CH | 685051 A5 | 3/1995 |
| CN | 102123837 B | 7/2014 |
| DE | 102012023688 A1 | 4/2014 |
| DE | 202014101739 U1 | 6/2014 |
| DE | 202014101741 U1 | 6/2014 |
| DE | 102013202204 A1 | 8/2014 |
| DE | 102013210158 A1 | 12/2014 |
| DE | 102013210716 A1 | 12/2014 |
| DE | 102013212598 A1 | 12/2014 |
| DE | 102013212622 A1 | 12/2014 |
| DE | 102013212634 A1 | 12/2014 |
| DE | 102013212639 A1 | 12/2014 |
| DE | 102013212644 A1 | 12/2014 |
| DE | 102013212653 A1 | 12/2014 |
| DE | 102013212654 A1 | 12/2014 |
| DE | 102013212661 A1 | 12/2014 |
| DE | 102013212666 A1 | 12/2014 |
| DE | 102013212677 A1 | 12/2014 |
| DE | 102013212680 A1 | 12/2014 |
| DE | 102013212687 A1 | 12/2014 |
| DE | 102013212690 A1 | 12/2014 |
| DE | 102013212700 A1 | 12/2014 |
| DE | 102014210836 A1 | 12/2014 |
| EP | 0078896 A2 | 5/1983 |
| EP | 0152768 A3 | 9/1987 |
| EP | 0293163 A2 | 11/1988 |
| EP | 0480133 A2 | 4/1992 |
| EP | 0652919 A1 | 5/1995 |
| EP | 0662110 A1 | 7/1995 |
| EP | 0500369 B1 | 1/1996 |
| EP | 0609864 B1 | 11/1996 |
| EP | 0771769 | 5/1997 |
| EP | 0812456 B1 | 12/1997 |
| EP | 0651778 B1 | 5/1998 |
| EP | 0614861 B1 | 5/2001 |
| EP | 0931032 B3 | 7/2001 |
| EP | 0833803 | 8/2001 |
| EP | 1356152 A2 | 10/2003 |
| EP | 1371451 A1 | 12/2003 |
| EP | 1383631 B1 | 1/2004 |
| EP | 1015181 B1 | 3/2004 |
| EP | 1492845 A1 | 1/2005 |
| EP | 1851007 A1 | 11/2007 |
| EP | 1960157 A1 | 8/2008 |
| EP | 2176031 A1 | 4/2010 |
| EP | 2184134 A1 | 5/2010 |
| EP | 2390056 A2 | 11/2011 |
| EP | 1800801 B1 | 3/2012 |
| EP | 2537216 A1 | 12/2012 |
| EP | 2567784 A1 | 3/2013 |
| EP | 2631286 A1 | 8/2013 |
| EP | 2692813 A1 | 2/2014 |
| EP | 2692814 A1 | 2/2014 |
| EP | 2692815 A1 | 2/2014 |

(56) References Cited

FOREIGN PATENT DOCUMENTS

| | | |
|---|---|---|
| EP | 2692816 A1 | 2/2014 |
| EP | 2692817 A1 | 2/2014 |
| EP | 2692818 A1 | 2/2014 |
| EP | 2692819 A1 | 2/2014 |
| EP | 2692820 A1 | 2/2014 |
| EP | 2692821 A1 | 2/2014 |
| EP | 2719752 A1 | 4/2014 |
| EP | 2720676 A1 | 4/2014 |
| EP | 2012972 B1 | 6/2014 |
| FR | 2354373 A1 | 1/1978 |
| GB | 986847 A | 3/1965 |
| GB | 1466054 | 3/1977 |
| JP | 53064890 A | 6/1978 |
| JP | 60-006356 U | 1/1985 |
| JP | 62002946 B | 1/1987 |
| JP | 63036905 B | 7/1988 |
| JP | 3079277 A | 4/1991 |
| JP | 03-287687 | 12/1991 |
| JP | 5285833 A | 11/1993 |
| JP | 6114739 A | 4/1994 |
| JP | 7008474 B2 | 2/1995 |
| JP | 10113875 A | 5/1998 |
| JP | 2779252 B2 | 7/1998 |
| JP | 10330734 A | 12/1998 |
| JP | H10315142 A | 12/1998 |
| JP | 2957492 B2 | 10/1999 |
| JP | 2000091280 A | 3/2000 |
| JP | 2000-336344 A | 12/2000 |
| JP | 3160084 B2 | 4/2001 |
| JP | 2001162541 A | 6/2001 |
| JP | 03194269 B2 | 7/2001 |
| JP | 2001207160 A | 7/2001 |
| JP | 2002-038131 A | 2/2002 |
| JP | 2003-049158 A | 2/2003 |
| JP | 2004-510873 A | 4/2004 |
| JP | 2004209624 A | 7/2004 |
| JP | 2006159402 A | 6/2006 |
| JP | 2006-192540 A | 7/2006 |
| JP | 2008194761 A | 8/2008 |
| JP | 5238725 B2 | 7/2013 |
| JP | 5238726 B2 | 7/2013 |
| NL | 171464 B | 11/1982 |
| WO | 1994002559 A1 | 2/1994 |
| WO | 95/03370 | 2/1995 |
| WO | 95/18192 A1 | 7/1995 |
| WO | 1995020469 A1 | 8/1995 |
| WO | 96/27189 A1 | 9/1996 |
| WO | 1997014536 A1 | 4/1997 |
| WO | 1999006500 A1 | 2/1999 |
| WO | 99/38817 A1 | 8/1999 |
| WO | 1999038817 A1 | 8/1999 |
| WO | 9954424 A1 | 10/1999 |
| WO | 01/14494 A1 | 3/2001 |
| WO | 2002097150 | 12/2002 |
| WO | 03/087236 A1 | 10/2003 |
| WO | 2005/080624 A1 | 9/2005 |
| WO | 2006/027593 | 3/2006 |
| WO | 2007/041538 A1 | 4/2007 |
| WO | 2009085578 A2 | 7/2009 |
| WO | 2010/077509 A1 | 7/2010 |
| WO | 2010085587 A1 | 7/2010 |
| WO | 2010/151201 | 12/2010 |
| WO | 2011/068724 A2 | 6/2011 |
| WO | 2011068714 A2 | 6/2011 |
| WO | 2011087649 A2 | 7/2011 |
| WO | 2011/109188 A2 | 9/2011 |
| WO | 2011/139562 A2 | 11/2011 |
| WO | 2011/149625 A2 | 12/2011 |
| WO | 2012/018903 A2 | 2/2012 |
| WO | 2012/061016 A1 | 5/2012 |
| WO | 2012/061033 A2 | 5/2012 |
| WO | 2012/092590 A2 | 7/2012 |
| WO | 2012/092605 A2 | 7/2012 |
| WO | 2012/112305 A2 | 8/2012 |
| WO | 2012/112322 A2 | 8/2012 |
| WO | 2012/141905 A2 | 10/2012 |
| WO | 2013/003830 A2 | 1/2013 |
| WO | 2013/003831 A2 | 1/2013 |
| WO | 2013/009484 A2 | 1/2013 |
| WO | 2013/036402 A1 | 3/2013 |
| WO | 2013/045251 A1 | 4/2013 |
| WO | 2013/049239 A1 | 4/2013 |
| WO | 2013070576 A2 | 5/2013 |
| WO | 2013/101575 A1 | 7/2013 |
| WO | 2013/102170 A1 | 7/2013 |
| WO | 2013/102176 A1 | 7/2013 |
| WO | 2013/102177 A1 | 7/2013 |
| WO | 2013/106597 A1 | 7/2013 |
| WO | 2013/106602 A1 | 7/2013 |
| WO | 2013/151745 A1 | 10/2013 |
| WO | 2013/177446 A1 | 11/2013 |
| WO | 2013/186146 A1 | 12/2013 |
| WO | 2013/188038 A1 | 12/2013 |
| WO | 2014/005120 A1 | 1/2014 |
| WO | 2014/161001 A1 | 2/2014 |
| WO | 2014020068 A1 | 2/2014 |
| WO | 2014020075 A1 | 2/2014 |
| WO | 2014022453 A1 | 2/2014 |
| WO | 2014022462 A1 | 2/2014 |
| WO | 2014022465 A1 | 2/2014 |
| WO | 2014/057273 A1 | 4/2014 |
| WO | 2014/062701 A1 | 4/2014 |
| WO | 2014/070468 A1 | 5/2014 |
| WO | 2014/106173 A1 | 7/2014 |
| WO | 2014/106211 A1 | 7/2014 |
| WO | 2014/124554 A1 | 8/2014 |
| WO | 2014/137972 A1 | 9/2014 |
| WO | 2014/140689 A1 | 9/2014 |
| WO | 2014/165390 A1 | 10/2014 |
| WO | 2014/176108 A1 | 10/2014 |
| WO | 2014/206739 A1 | 12/2014 |
| WO | 2014/206890 A1 | 12/2014 |
| WO | 2014/206967 A1 | 12/2014 |
| WO | 2014/209567 A1 | 12/2014 |
| WO | 2014/210160 A1 | 12/2014 |
| WO | 2014/210442 A1 | 12/2014 |
| WO | 2014/210532 A1 | 12/2014 |
| WO | 2014/210568 A1 | 12/2014 |
| WO | 2015/050781 A1 | 4/2015 |
| WO | 2015/073346 A1 | 5/2015 |
| WO | 2015/048768 A9 | 6/2015 |
| WO | 2015/088953 A1 | 6/2015 |
| WO | 2015/089527 A1 | 6/2015 |
| WO | 2015/089528 A1 | 6/2015 |
| WO | 2015/089529 A1 | 6/2015 |
| WO | 2015/100018 A1 | 7/2015 |
| WO | 2015/100020 A1 | 7/2015 |
| WO | 2015/100220 A1 | 7/2015 |
| WO | 2015/102992 A1 | 7/2015 |
| WO | 2015/112379 A1 | 7/2015 |
| WO | 2015/130487 A1 | 9/2015 |
| WO | 2015/158009 A1 | 10/2015 |
| WO | 2015/160854 A1 | 10/2015 |
| WO | 2015/160855 A1 | 10/2015 |
| WO | 2015/160857 A1 | 10/2015 |
| WO | 2015/164211 A1 | 10/2015 |
| WO | 2015/165122 A1 | 11/2015 |
| WO | 2015/167910 A1 | 11/2015 |
| WO | 2015/179335 A1 | 11/2015 |
| WO | 2015/180005 A1 | 12/2015 |
| WO | 2015/184355 A1 | 12/2015 |
| WO | 2016/028683 A1 | 2/2016 |
| WO | 2016/044158 A1 | 3/2016 |
| WO | 2016/064726 A1 | 4/2016 |
| WO | 2016/089675 A1 | 6/2016 |
| WO | 2016/105469 A1 | 6/2016 |
| WO | 2016/105474 A1 | 6/2016 |
| WO | 2016/160357 A1 | 10/2016 |
| WO | 2016/161157 A1 | 10/2016 |
| WO | 2016/161170 A1 | 10/2016 |
| WO | 2016/167967 A1 | 10/2016 |
| WO | 2016/187570 A1 | 11/2016 |
| WO | 2016/196795 A1 | 12/2016 |
| WO | 2016/201104 A1 | 12/2016 |

(56) References Cited

FOREIGN PATENT DOCUMENTS

| WO | 2016/205133 A1 | 12/2016 |
| WO | 2016/205267 A1 | 12/2016 |
| WO | 2016/210057 A1 | 12/2016 |
| WO | 2017/007703 A1 | 1/2017 |
| WO | 2017/007714 A1 | 1/2017 |
| WO | 2017/062482 A1 | 4/2017 |
| WO | 2017/083249 A1 | 5/2017 |
| WO | 2017/083255 A1 | 5/2017 |
| WO | 2016/105543 A9 | 9/2017 |
| WO | 2017/151498 A1 | 9/2017 |
| WO | 2018/010730 A2 | 1/2018 |
| WO | 2018/026669 A1 | 2/2018 |
| WO | 2018/057465 A1 | 3/2018 |
| WO | 2018/057558 A1 | 3/2018 |
| WO | 2018/063902 A1 | 4/2018 |
| WO | 2018/063958 A1 | 4/2018 |
| WO | 2018/063960 A1 | 4/2018 |
| WO | 2018/063962 A1 | 4/2018 |
| WO | 2018/064642 A1 | 4/2018 |
| WO | 2018/080703 A1 | 5/2018 |
| WO | 2018/080704 A1 | 5/2018 |
| WO | 2018/080705 A1 | 5/2018 |
| WO | 2018/080755 A1 | 5/2018 |
| WO | 2018/080756 A1 | 5/2018 |
| WO | 2018/080765 A1 | 5/2018 |
| WO | 2018/080778 A1 | 5/2018 |
| WO | 2018/080784 A1 | 5/2018 |
| WO | 2018/081246 A1 | 5/2018 |

OTHER PUBLICATIONS

Austin, Benson M., "Thick-Film Screen Printing," Solid State Technology, Jun. 1969, pp. 53-58.

Avril, Nicholas Joseph, "Manufacturing Glass-fiber Reinforcement for Grinding Wheels," Massachusetts Institute of Technology, 1996, 105 pgs.

Besse, John R., "Understanding and controlling wheel truing and dressing forces when rotary plunge dressing," Cutting Tool Engineering, Jun. 2012, vol. 64, Issue 6, 5 pages.

Brewer, L. et al., Journal of Materials Research, 1999, vol. 14, No. 10, pp. 3907-3912.

Ciccotti, M. et al., "Complex dynamics in the peeling of an adhesive tape," International Journal of Adhesion & Adhesives 24 (2004) pp. 143-151.

Dupont, "Kevlar Aramid Pulp", Copyright 2011, DuPont, 1 page.

J. European Ceramic Society 31, Abstract only (2011) 2073-2081.

Riemer, Dietrich E., "Analytical Engineering Model of the Screen Printing Process: Part II," Solid State Technology, Sep. 1988, pp. 85-90.

Miller, L.F., "Paste Transfer in the Screening Process," Solid State Technology, Jun. 1969, pp. 46-52.

Morgan, P. et al., "Ceramic Composites of Monazite and Alumina," J. Am. Ceram. Soc., 78, 1995, 1553-63.

Riemer, Dietrich E., "Analytical Engineering Model of the Screen Printing Process: Part I," Solid State Technology, Aug. 1988, pp. 107-111.

Badger, Jeffrey, "Evaluation of Triangular, Engineered-Shape Ceramic Abrasive in Cutting Discs," Supplement to the Melding Journal, Apr. 2014, vol. 93, pp. 107-s to 115-s.

3M Cubitron II Abrasive Belts Brochure, Shaping the Future, Jan. 2011, 6 pages.

Graf, "Cubitron II: Precision-Shaped Grain (PSG) Turns the Concept of Gear Grinding Upside Down," gearsolutions.com, May 2014, pp. 36-44.

Dow Machine Tool Accessories, Grinding & Surface Finishing, www.1mta.com, Nov. 2014, 72 pages.

\* cited by examiner

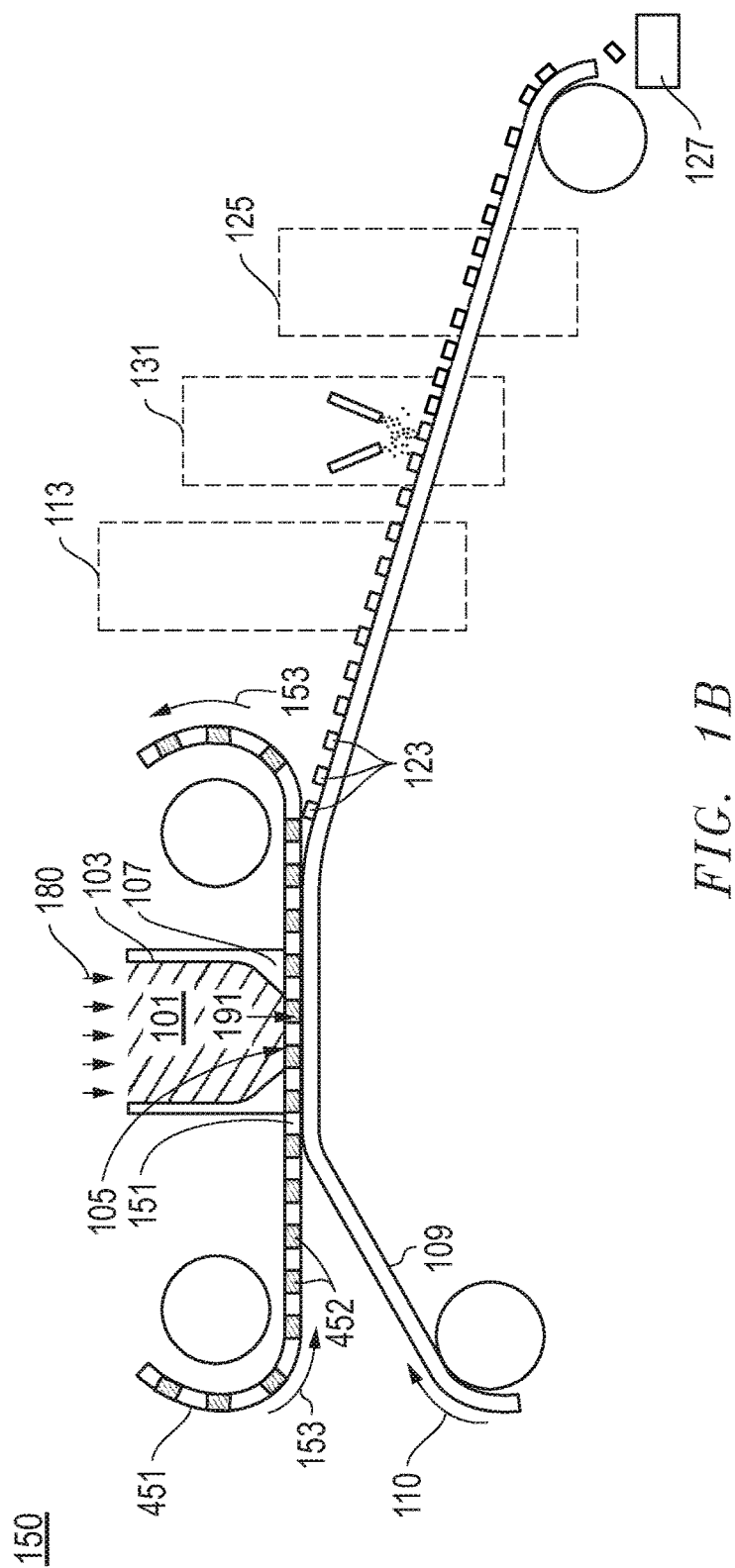
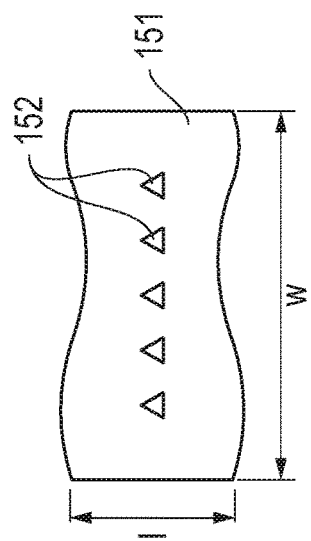
FIG. 1B
FIG. 1C

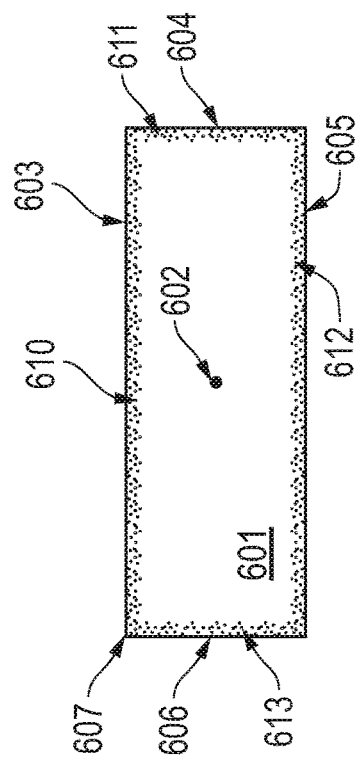
FIG. 6
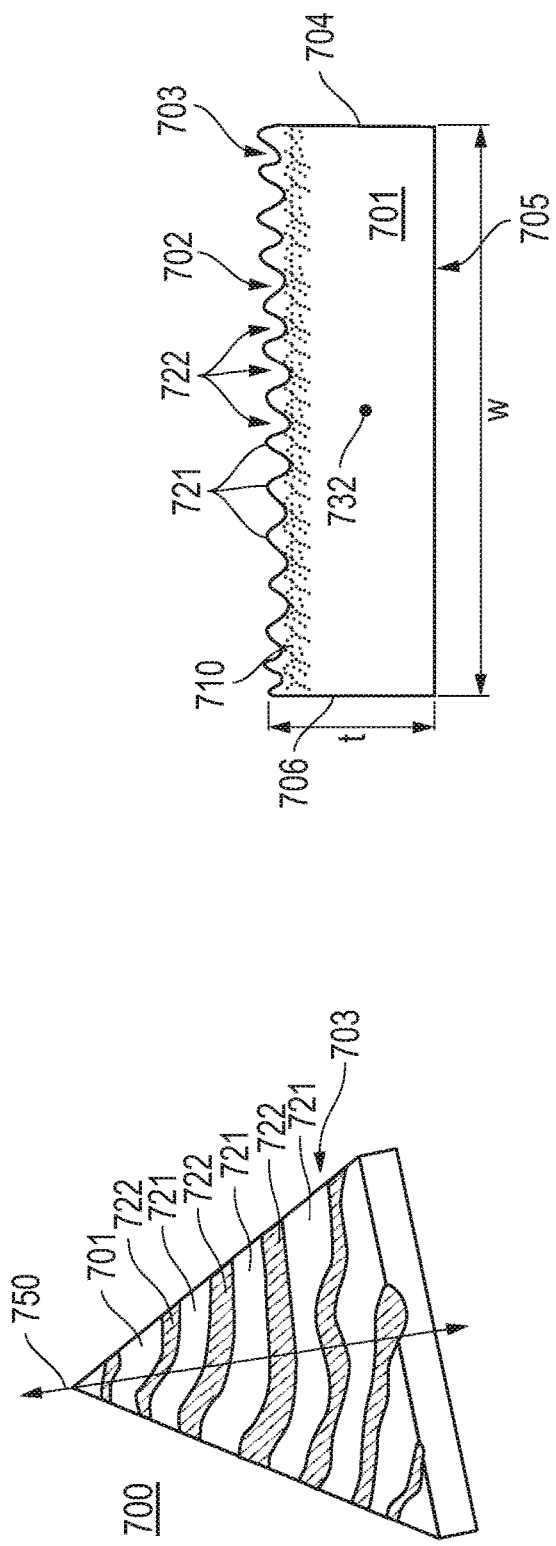
FIG. 7B
FIG. 7A

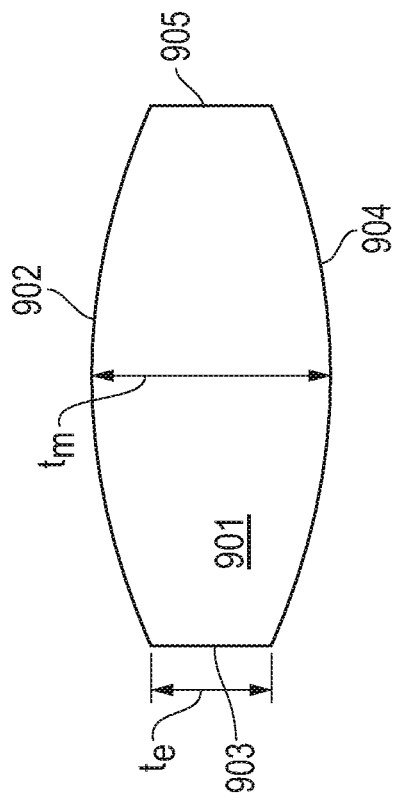
FIG. 9
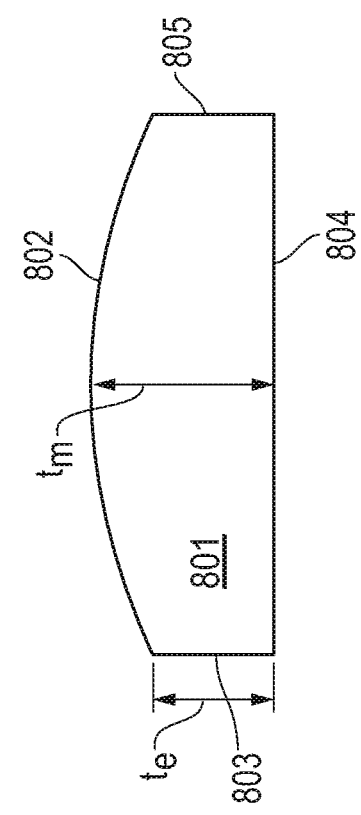
FIG. 8
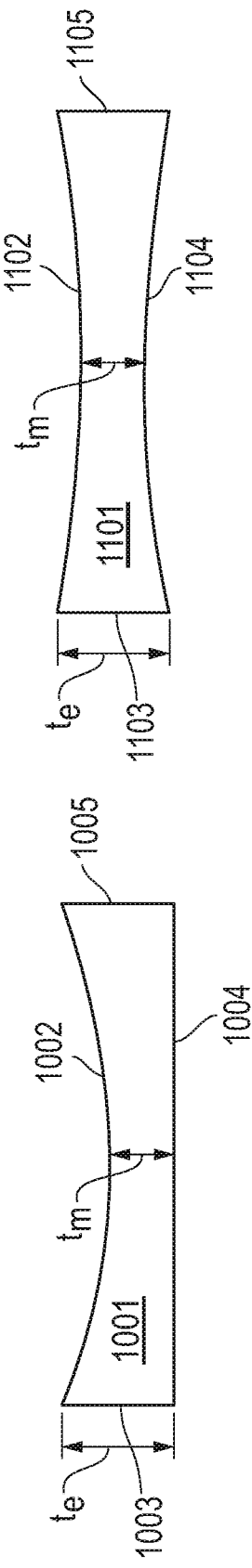
FIG. 11
FIG. 10

SHAPED ABRASIVE PARTICLE INCLUDING DOPANT MATERIAL AND METHOD OF FORMING SAME

PRIORITY CLAIM AND CROSS-REFERENCE TO RELATED APPLICATION

This application is a continuation of U.S. patent application Ser. No. 14/607,308, entitled "Shaped Abrasive Particle Including Dopant Material and Method of Forming Same," by Doruk O. Yener and Paul Braun, filed Jan. 28, 2015, which claims priority under 35 U.S.C. § 119(e) to U.S. Patent Application No. 61/934,103 entitled "Shaped Abrasive Particle Including Dopant Material and Method of Forming Same," by Doruk O. Yener and Paul Braun, filed Jan. 31, 2014, which are assigned to the current assignee hereof and incorporated herein by reference in their entireties.

BACKGROUND

Field of the Disclosure

The following is directed to shaped abrasive particles, and more particularly, to shaped abrasive particles having certain features and a method of forming such shaped abrasive particles.

Description of the Related Art

Abrasive articles incorporating abrasive particles are useful for various material removal operations including grinding, finishing, polishing, and the like. Depending upon the type of abrasive material, such abrasive particles can be useful in shaping or grinding various materials in the manufacturing of goods. Certain types of abrasive particles have been formulated to date that have particular geometries, such as triangular shaped abrasive particles and abrasive articles incorporating such objects. See, for example, U.S. Pat. Nos. 5,201,916; 5,366,523; and 5,984,988.

Previously, three basic technologies that have been employed to produce abrasive particles having a specified shape, which are fusion, sintering, and chemical ceramic. In the fusion process, abrasive particles can be shaped by a chill roll, the face of which may or may not be engraved, a mold into which molten material is poured, or a heat sink material immersed in an aluminum oxide melt. See, for example, U.S. Pat. No. 3,377,660. In sintering processes, abrasive particles can be formed from refractory powders having a particle size of up to 10 micrometers in diameter. Binders can be added to the powders along with a lubricant and a suitable solvent to form a mixture that can be shaped into platelets or rods of various lengths and diameters. See, for example, U.S. Pat. No. 3,079,242. Chemical ceramic technology involves converting a colloidal dispersion or hydrosol (sometimes called a sol) to a gel or any other physical state that restrains the mobility of the components, drying, and firing to obtain a ceramic material. See, for example, U.S. Pat. Nos. 4,744,802 and 4,848,041.

The industry continues to demand improved abrasive materials and abrasive articles.

SUMMARY

In one aspect, a particulate material includes a shaped abrasive particle having a body including a length, a width, and a thickness, wherein the body comprises a central region including the geometric center of the body having a first dopant material present in a center dopant amount ($D_{Cc}$), the body further comprising an upper surface defined by the dimensions of length and width, the upper surface having a second dopant material present in an upper surface dopant amount ($D_{USc}$), wherein the body comprises a dopant amount difference ($\Delta D_c$) between the first dopant amount and the second dopant amount.

In a second aspect, a method of forming a shaped abrasive particle includes extruding a mixture into a form, applying a dopant material to an exterior surface of the form, and forming a precursor shaped abrasive particle from the form.

According to a third aspect, a particulate material includes a shaped abrasive particle having a body comprising a length (l), a width, (w), and a thickness (t), wherein the body has a first exterior surface having a first dopant amount ($D_{1c}$) of a first dopant material, a second exterior surface spaced apart from the first exterior surface by at least one edge, the second exterior surface having a second dopant amount ($D_{2c}$) of a second dopant material, and wherein the body comprises a dopant amount difference ($\Delta D_c$) between the first dopant amount and the second dopant amount.

In yet another aspect, a particulate material includes a shaped abrasive particle having a body comprising a length, a width, and a height, wherein the body comprises an upper surface defined by dimensions of the length and width, the upper surface having a dopant material forming a pattern on the upper surface.

According to yet another aspect, a particulate material includes a shaped abrasive particle having a body comprising a length, a width, and a thickness, wherein the body comprises a central region including the geometric center of the body having a first microstructure, the body further comprising an upper surface defined by the dimensions of length and width, the upper surface having a second microstructure, wherein the first microstructure is different from the second microstructure.

BRIEF DESCRIPTION OF THE DRAWINGS

The present disclosure may be better understood, and its numerous features and advantages made apparent to those skilled in the art by referencing the accompanying drawings.

FIG. 1B includes a system for forming a particulate material in accordance with an embodiment.

FIG. 1C includes an illustration of a portion of a screen according to an embodiment.

FIG. 6 includes a cross-sectional illustration of a portion of a shaped abrasive particle in accordance with an embodiment.

FIG. 7A includes a perspective view illustration of a shaped abrasive particle in accordance with an embodiment.

FIG. 7B includes a cross-sectional illustration of a portion of the shaped abrasive particle of FIG. 7A.

FIG. 8 includes a cross-sectional illustration of a portion of a shaped abrasive particle in accordance with an embodiment.

FIG. 9 includes a cross-sectional illustration of a portion of a shaped abrasive particle in accordance with an embodiment.

FIG. 10 includes a cross-sectional illustration of a portion of a shaped abrasive particle in accordance with an embodiment.

FIG. 11 includes a cross-sectional illustration of a portion of a shaped abrasive particle in accordance with an embodiment.

DETAILED DESCRIPTION

The following is directed to methods of forming shaped abrasive particles and features of such shaped abrasive particles. The shaped abrasive particles may be used in various abrasive articles, including for example bonded abrasive articles, coated abrasive articles, and the like. Alternatively, the shaped abrasive particles of the embodiments herein may be utilized in free abrasive technologies, including for example grinding and/or polishing slurries.

Figure 1A:
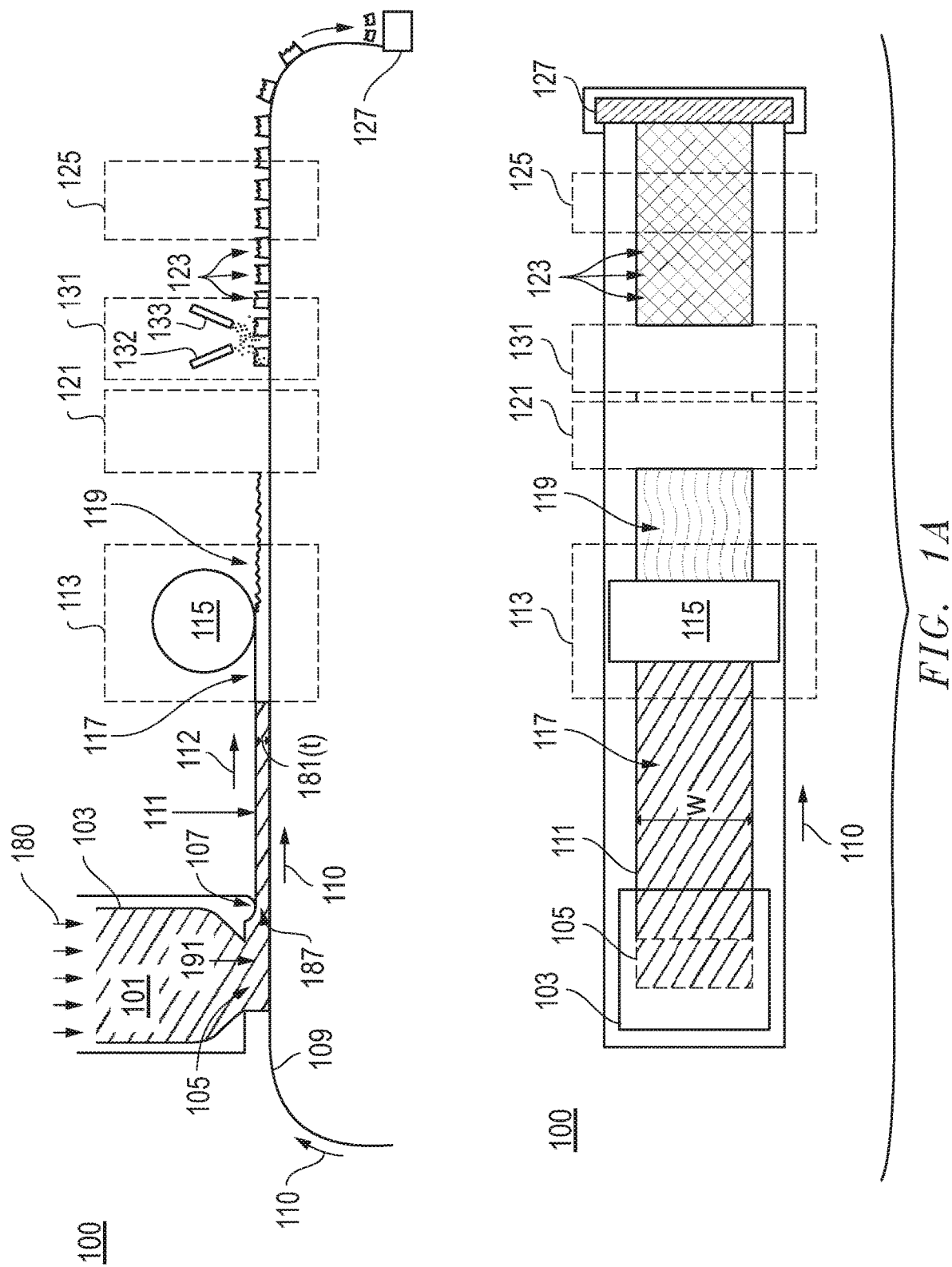
FIG. 1A includes a system for forming a particulate material in accordance with an embodiment.

FIG. 1 includes an illustration of a system for forming a shaped abrasive particle in accordance with an embodiment. The process of forming shaped abrasive particles can be initiated by forming a mixture 101 including a ceramic material and a liquid. In particular, the mixture 101 can be a gel formed of a ceramic powder material and a liquid, wherein the gel can be characterized as a shape-stable material having the ability to hold a given shape even in the green (i.e., unfired) state. In accordance with an embodiment, the gel can be formed of the ceramic powder material as an integrated network of discrete particles.

The mixture 101 can be formed to have a particular content of solid material, such as the ceramic powder material. For example, in one embodiment, the mixture 101 can have a solids content of at least about 25 wt %, such as at least about 35 wt %, or even at least about 42 wt % for the total weight of the mixture 101. Still, in at least one non-limiting embodiment, the solid content of the mixture 101 can be not greater than about 75 wt % such as not greater than about 70 wt %, not greater than about 65 wt %, or even not greater than about 55 wt %. It will be appreciated that the content of the solids materials in the mixture 101 can be within a range between any of the minimum and maximum percentages noted above.

According to one embodiment, the ceramic powder material can include an oxide, a nitride, a carbide, a boride, an oxycarbide, an oxynitride, and a combination thereof. In particular instances, the ceramic material can include alumina. More specifically, the ceramic material may include a boehmite material, which may be a precursor of alpha alumina.

Furthermore, the mixture 101 can be formed to have a particular content of liquid material. Some suitable liquids may include organic materials, such as water. In accordance with one embodiment, the mixture 101 can be formed to have a liquid content less than the solids content of the mixture 101. In more particular instances, the mixture 101 can have a liquid content of at least about 25 wt % for the total weight of the mixture 101. In other instances, the amount of liquid within the mixture 101 can be greater, such as at least about 35 wt %, at least about 45 wt %, at least about 50 wt %, or even at least about 58 wt %. Still, in at least one non-limiting embodiment, the liquid content of the mixture can be not greater than about 75 wt %, such as not greater than about 70 wt %, not greater than about 65 wt %, not greater than about 60 wt %, or even not greater than about 65 wt %. It will be appreciated that the content of the liquid in the mixture 101 can be within a range between any of the minimum and maximum percentages noted above.

Furthermore, to facilitate processing and forming shaped abrasive particles according to embodiments herein, the mixture 101 can have a particular storage modulus. For example, the mixture 101 can have a storage modulus of at least about $1\times10^4$ Pa, such as at least about $4\times10^4$ Pa, or even at least about $5\times10^4$ Pa. However, in at least one non-limiting embodiment, the mixture 101 may have a storage modulus of not greater than about $1\times10^7$ Pa, such as not greater than about $1\times10^6$ Pa. It will be appreciated that the storage modulus of the mixture 101 can be within a range between any of the minimum and maximum values noted above. It will be appreciated that the storage modulus of the mixture 101 can be within a range between any of the minimum and maximum values noted above. The storage modulus can be measured via a parallel plate system using ARES or AR-G2 rotational rheometers, with Peltier plate temperature control systems. For testing, the mixture 101 can be extruded within a gap between two plates that are set to be approximately 8 mm apart from each other. After extruding the get into the gap, the distance between the two plates defining the gap is reduced to 2 mm until the mixture 101 completely fills the gap between the plates. After wiping away excess mixture, the gap is decreased by 0.1 mm and the test is initiated. The test is an oscillation strain sweep test conducted with instrument settings of a strain range between 01% to 100%, at 6.28 rad/s (1 Hz), using 25-mm parallel plate and recording 10 points per decade. Within 1 hour after the test completes, lower the gap again by 0.1 mm and repeat the test. The test can be repeated at least 6 times. The first test may differ from the second and third tests. Only the results from the second and third tests for each specimen should be reported.

Moreover, the mixture 101 can be formed to have a particular content of organic materials, including for example, organic additives that can be distinct from the liquid, to facilitate processing and formation of shaped abrasive particles according to the embodiments herein. Some suitable organic additives can include stabilizers, binders, such as fructose, sucrose, lactose, glucose, UV curable resins, and the like.

Notably, the embodiments herein may utilize a mixture 101 that is distinct from slurries used in conventional tape casting operations. For example, the content of organic materials, within the mixture 101, particularly, any of the organic additives noted above, may be a minor amount as compared to other components within the mixture 101. In at least one embodiment, the mixture 101 can be formed to have not greater than about 30 wt % organic material for the total weight of the mixture 101. In other instances, the amount of organic materials may be less, such as not greater than about 15 wt %, not greater than about 10 wt %, or even not greater than about 5 wt %. Still, in at least one non-limiting embodiment, the amount of organic materials within the mixture 101 can be at least about 0.5 wt % for the total weight of the mixture 101. It will be appreciated that the amount of organic materials in the mixture 101 can be within a range between any of the minimum and maximum values noted above.

Moreover, the mixture 101 can be formed to have a particular content of acid or base distinct from the liquid, to facilitate processing and formation of shaped abrasive particles according to the embodiments herein. Some suitable acids or bases can include nitric acid, sulfuric acid, citric acid, chloric acid, tartaric acid, phosphoric acid, ammonium nitrate, ammonium citrate. According to one particular embodiment, the mixture 101 can have a pH of less than about 5, and more particularly, within a range between about 2 and about 4, using a nitric acid additive.

Referencing FIG. 1, the system 100 can include a die 103. As illustrated, the mixture 101 can be provided within the interior of the die 103 and configured to be extruded through a die opening 105 positioned at one end of the die 103. As further illustrated, extruding can include applying a force 180 (or a pressure) on the mixture 101 to facilitate extruding the mixture 101 through the die opening 105.

In accordance with an embodiment, a particular pressure may be utilized during extrusion. For example, the pressure can be at least about 10 kPa, such as at least about 500 kPa. Still, in at least one non-limiting embodiment, the pressure utilized during extrusion can be not greater than about 4 MPa. It will be appreciated that the pressure used to extrude the mixture 101 can be within a range between any of the minimum and maximum values noted above.

In certain systems, the die 103 can include a die opening 105 having a particular shape. It will be appreciated that the die opening 105 may be shaped to impart a particular shape to the mixture 101 during extrusion. In accordance with an embodiment, the die opening 105 can have a rectangular shape. Furthermore, the mixture 101 extruded through the die opening 105 can have essentially the same cross-sectional shape as the die opening 105. As such, for certain embodiments, the mixture 101 may be extruded as a form. Reference herein to a form is a general reference to an extrudate. The form can have various shapes and contours. In the illustrated embodiment, the process can include extruding a form having the shape of a sheet 111. The sheet 111 can have a generally rectangular cross-sectional shape as viewed in a plane defined by a thickness and width of the sheet 111.

As further illustrated, the mixture 101 may be extruded in the form of a sheet 111 and onto a belt 109 underlying the die 103. In specific instances, the mixture 101 can be extruded in the form of a sheet 111 directly onto the belt 109, which may facilitate continuous processing.

In some embodiments, the belt 109 can be translated while extruding the mixture 101 through the die opening 105. As illustrated in the system 100, the mixture 101 may be extruded in a direction 191. The direction of translation 110 of the belt 109 can be angled relative to the direction of extrusion 191 of the mixture. While the angle between the direction of translation 110 and the direction of extrusion 191 are illustrated as substantially orthogonal in the system 100, other angles are contemplated, including for example, an acute angle or an obtuse angle. Moreover, while the mixture 101 is illustrated as being extruded in a direction 191, which is angled relative to the direction of translation 110 of the belt 109, in an alternative embodiment, the belt 109 and mixture 101 may be extruded in substantially the same direction.

The belt 109 may be translated at a particular rate to facilitate processing. For example, the belt 109 may be translated at a rate of at least about 3 cm/s. In other embodiments, the rate of translation of the belt 109 may be greater, such as at least about 4 cm/s, at least about 6 cm/s, at least about 8 cm/s, or even at least about 10 cm/s. Still, in at least one non-limiting embodiment, the belt 109 may be translated in a direction 110 at a rate of not greater than about 5 m/s, not greater than about 1 m/s, or even not greater than about 0.5 m/s. It will be appreciated that the screen 151 may be translated at a rate within a range between any of the minimum and maximum values noted above.

For certain processes according to embodiments herein, the rate of translation of the belt 109 as compared to the rate of extrusion of the mixture 101 in the direction 191 may be controlled to facilitate proper processing. For example, the rate of translation of the belt 109 can be essentially the same as the rate of extrusion to ensure formation of a suitable sheet 111.

After the mixture 101 is extruded through the die opening 105, the mixture 101 may be translated along the belt 109 under a knife edge 107 attached to a surface of the die 103. The knife edge 107 may define a region 108, which can be in the form of an opening between the knife edge 107 and the belt 109 that facilitates forming a sheet 111, and particularly a sheet of certain dimensions. The sheet 11 can have particular dimensions, including for example a length (l), a width (w), and a thickness (t). In accordance with an embodiment, the sheet 111 may have a length that extends in the direction of the translating belt 109, which can be greater than the width, wherein the width of the sheet 111 is a dimension extending in a direction perpendicular to the length of the belt 109 and to the length of the sheet. The sheet 111 can have a thickness 181, wherein the length and width are greater than the thickness 181 of the sheet 111.

Notably, the thickness 181 of the sheet 111 can be the dimension extending vertically from the surface of the belt 109. In accordance with an embodiment, the sheet 111 can be formed to have a particular dimension of thickness 181, wherein the thickness may be an average thickness of the sheet 111 derived from multiple measurements. For example, the thickness 181 of the sheet 111 can be at least about 0.1 mm, such as at least about 0.5 mm. In other instances, the thickness 181 of the sheet 111 can be greater, such as at least about 0.8 mm, at least about 1 mm, at least about 1.2 mm, at least about 1.6 mm, or even at least about 2 mm. Still, in one non-limiting embodiment, the thickness 181 of the sheet 111 may be not greater than about 10 mm, not greater than about 5 mm, or even not greater than about 2 mm. It will be appreciated that the sheet 111 may have an average thickness within a range between any of the minimum and maximum values noted above.

After extruding the mixture 101 from the die 103, the sheet 111 may be translated in a direction 112 along the surface of the belt 109. Translation of the sheet 111 along the belt 109 may facilitate further processing to form precursor shaped abrasive particles. For example, the sheet 111 may undergo a shaping process within the shaping zone 113. In particular instances, the process of shaping can include shaping a surface of the sheet 111, including for example, an upper major surface 117 of the sheet 111. In other embodiments, other major surfaces of the sheet may undergo shaping, including for example, the bottom surface or side surfaces. For certain processes, shaping can include altering a contour of the sheet through one or more processes, such as, embossing, rolling, cutting, engraving, patterning, stretching, twisting, and a combination thereof.

In one particular embodiment, the process of shaping can include forming a feature 119 in the upper major surface 117 of the sheet 111. More particularly, a shaping structure 115 may be contacted to the upper major surface 117 of the sheet 111 facilitating the formation of a feature 119 or a pattern of features in the upper major surface 117. It will be appreciated that the shaping structure 115 can take various forms, including for example, a roller having various features on its surface, wherein such features may be imparted to the upper major surface 117 of the sheet 111 upon contact between the shaping structure 115 and the upper major surface 117.

Still, it will be appreciated that alternative shaping structures and methods of shaping a sheet may be utilized. For example, the surface of the belt 109 may be textured such that features of the texture are imparted to the sheet 111, and the finally-formed shaped abrasive particles. Moreover, various devices may be used to impart a feature or pattern of features on the side surfaces of the sheet 111.

In accordance with an embodiment, the process of forming a shaped abrasive particle can further include translation of the sheet 111 along the belt 109 through a forming zone 121. In accordance with an embodiment, the process of forming a shaped abrasive particle can include sectioning the sheet 111 to form precursor shaped abrasive particles 123. For example, in certain instances, forming can include perforating a portion of the sheet 111. In other instances, the process of forming can include patterning the sheet 111 to form a patterned sheet and extracting shapes from the patterned sheet.

Particular processes of forming can include cutting, pressing, punching, crushing, rolling, twisting, and a combination thereof. In one embodiment, the process of forming can include cutting the sheet 111 using a water jet cutting process. In another embodiment, sectioning of the sheet 111 can include cutting with one or a plurality of blades. Alternatively, the process of forming shaped abrasive particles can include the use of radiation to section the sheet 111 into discrete precursor shaped abrasive particles. For example, use of radiation may include the use of a laser to score or otherwise cut discrete shaped abrasive particles from the sheet 111.

It will be appreciated that at least one blade may be translated through the sheet 111 to facilitate sectioning. In particular instances, a sectioning process using a blade can include translating a blade in multiple directions including a first direction, and a second direction different than the first direction through the sheet 111. More notably, certain sectioning processes may utilize a plurality of blades that can be translated across and through the sheet 111 in multiple directions to facilitate the formation of precursor shaped abrasive particles 123.

Figure 2:
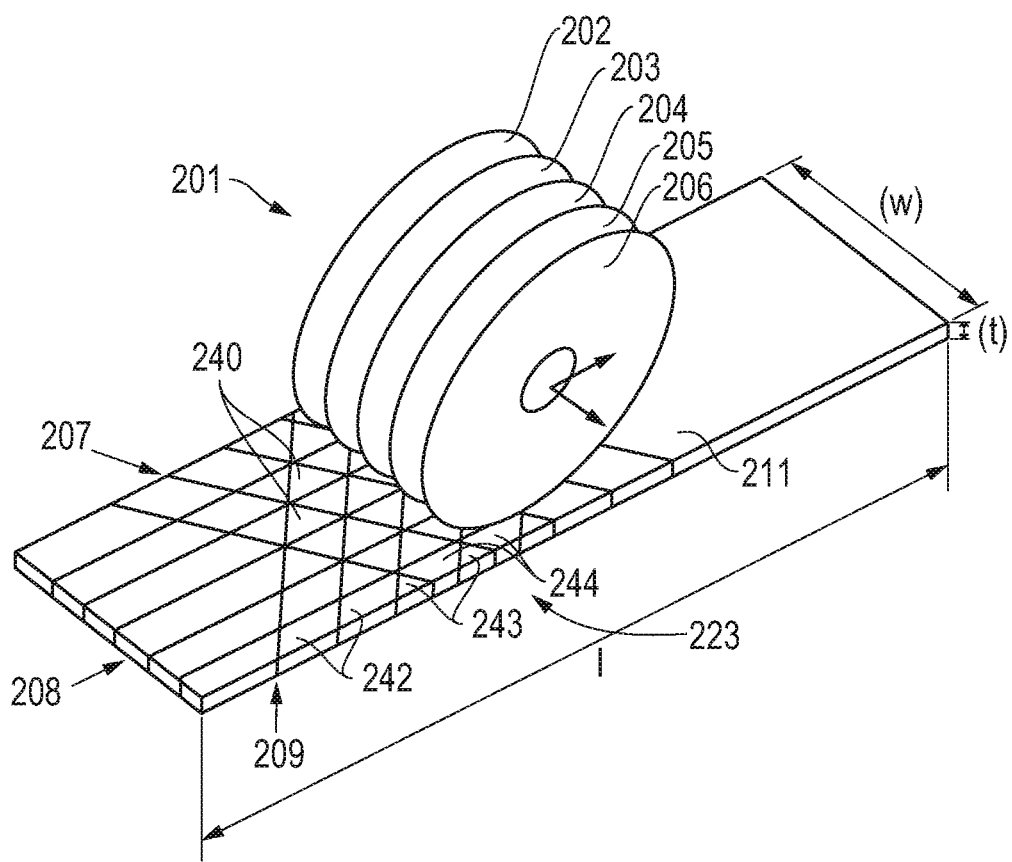
FIG. 2 includes a portion of a system for forming a particulate material in accordance with an embodiment.

FIG. 2 includes an illustration of a particular device that may be utilized within the forming zone 121 to facilitate sectioning. As illustrated, the process of sectioning may include the use of a cutting device 201 having a plurality of blades 202, 203, 204, 205, and 206 arranged in parallel to each other. The cutting device 201 can be translated in multiple directions through the sheet 111 to facilitate the formation of precursor shaped abrasive particles 123. For example, as illustrated in FIG. 2, the cutting device 201 may be translated first in a direction 207 angled with respect to the length (l) of the sheet 111. Thereafter, the cutting device 201 may be translated in a second direction 209 different that the first direction 207 and angled with respect to the first direction 207. Finally, the cutting device 201 may be translated across and through the sheet 111 in a third direction 208 that is different than the first direction 207 or second direction 209 to facilitate the formation of precursor shaped abrasive particles. While reference herein has noted that a single cutting device 201 may be translated in multiple directions, it will be appreciated that individual cutting devices may be utilized for discrete and individual cutting directions.

The process of sectioning can create different types of shaped abrasive particles in a single sectioning process. Notably, a batch of abrasive particles may be defined as a group of 100 or more particles formed from the same forming process, and particularly, a single sectioning process of an extruded form (e.g., a sheet). Different types of shaped abrasive particles can be formed from the same processes of the embodiments herein. Different types of shaped abrasive particles include a first type of shaped abrasive particle having a first two-dimensional shape versus a second type of shaped abrasive particle having a different two-dimensional shape. Furthermore, different types of shaped abrasive particles may differ from each other in size. For example, different types of shaped abrasive particles may have different volumes as compared to each other. A single process which is capable of forming different types of shaped abrasive particles may be particularly suited for producing certain types of abrasive articles.

As further illustrated, upon sectioning of the sheet 111 with a cutting device 201, a plurality of precursor shaped abrasive particles may be formed in the sheet 111. In particular instances, as illustrated in FIG. 2, a first type of precursor shaped abrasive particles 240 can be formed from the sheet 111. The precursor shaped abrasive particles 240 may have a generally triangular shape two-dimensional shape as viewed in a plane defined by the length (l) and width (w) of the sheet 111.

Furthermore, the sectioning process may form another type of precursor shaped abrasive particles 243 approximate to, and at, the edge of the sheet 111. The precursor shaped abrasive particles 243 can have a triangular two-dimensional shape as viewed in a plane defined by the length (l) and width (w) of the sheet 111. However, the precursor shaped abrasive particles 243 can be smaller in size as compared to the precursor shaped abrasive particles 240. In particular instances, the precursor shaped abrasive particles 243 can have a volume that is not greater than about 95% of the volume of the precursor shaped abrasive particles 240. Volume may be an average value calculated by the measurement of volume for at least 20 shaped abrasive particles of the same type. In other instances, the precursor shaped abrasive particles 243 can have a volume that is not greater than about 92%, not greater than about 90%, not greater than about 85%, such as not greater than about 80%, not greater than about 75%, not greater than about 60%, or even not greater than about 50% of the volume of the precursor shaped abrasive particles 240. Still, in one non-limiting embodiment, the precursor shaped abrasive particles 243 can have a volume that is at least about 10%, such as at least about 20%, at least about 30%, or even at least about 40% of the volume of the precursor shaped abrasive particles 240. The difference in volume between the precursor shaped abrasive particles 243 and precursor shaped abrasive particles 240 can be within a range between any of the minimum and maximum percentages noted above.

Another type of precursor shaped abrasive particles 242 may be formed in the same sectioning process used to form the precursor shaped abrasive particles 240 and 243 from the sheet 111. Notably, the precursor shaped abrasive particles 242 can have a quadrilateral two-dimensional shape as viewed in a plane defined by the width (w) and length (l) of the sheet 111. According to one particular embodiment, the precursor shaped abrasive particles 242 may have a two-dimensional shape of a parallelogram. It will be appreciated that the precursor shaped abrasive particles 242 can have a difference in volume as compared to the other precursor shaped abrasive particles as described in other embodiments herein.

The sectioning process may create another type of shaped abrasive particle 244 used to form the precursor shaped abrasive particles 240, 242, and 243 from the same sheet 111. Notably, the precursor shaped abrasive particles 244 can have a different two-dimensional polygonal shape as compared to the precursor shaped abrasive particles 240, 242, or 243. As illustrated in the embodiment of FIG. 2, the precursor shaped abrasive particles 244 can have a quadrilateral shape, and more particularly, a trapezoidal shape, as viewed in a plane defined by the width (w) and length (l) of the sheet 111. It will be appreciated that the precursor shaped abrasive particles 244 can have a difference in volume as compared to the other precursor shaped abrasive particles as described in other embodiments herein.

Figure 3:
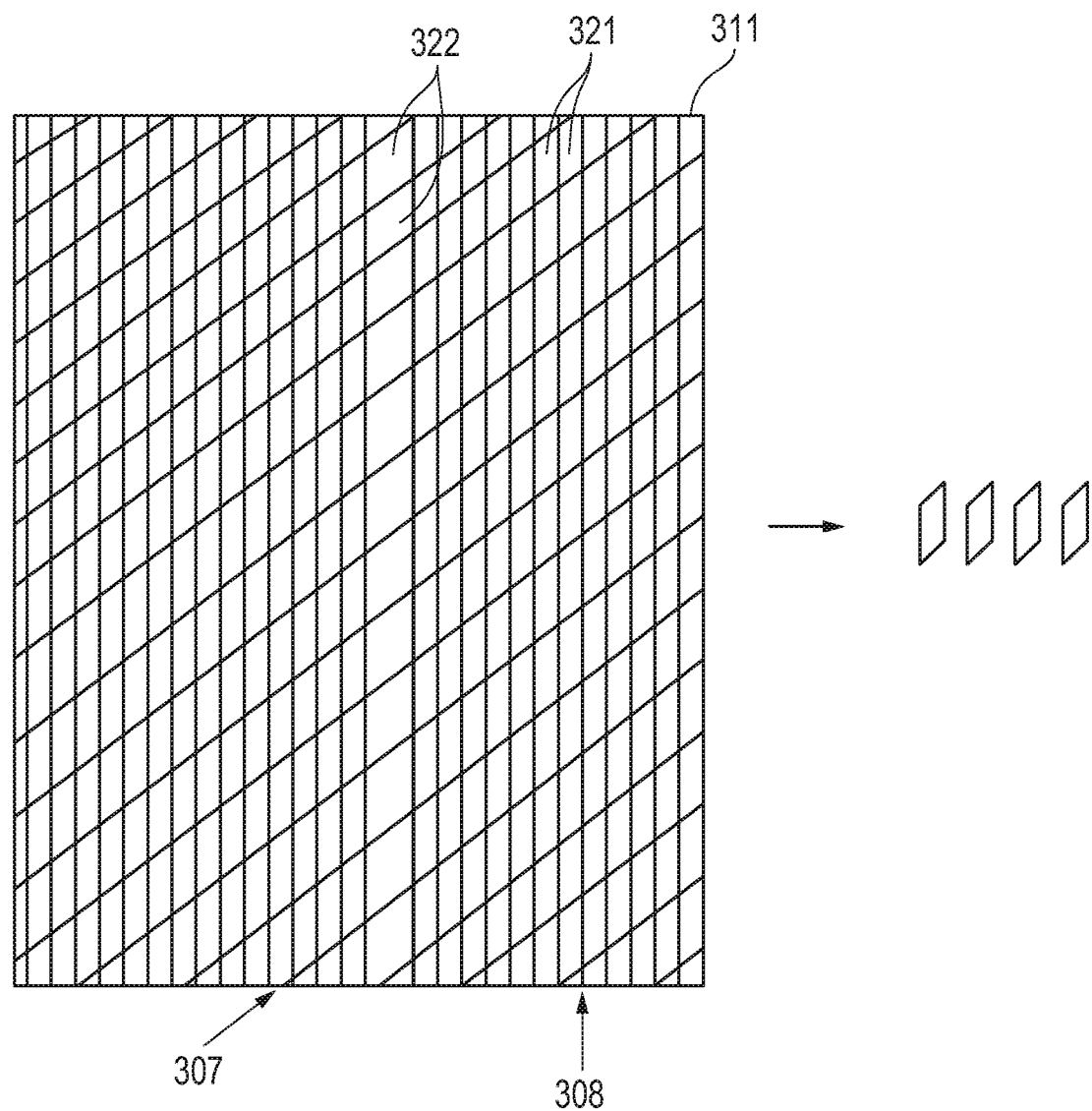
FIG. 3 includes an illustration of a portion of the process of forming a particulate material in accordance with an embodiment.

FIG. 3 includes an illustration of a portion of a sheet after a sectioning process in accordance with an embodiment. Notably, the sheet 111 can be cut in a first direction 308, and subsequently cut in a second direction 307 at an angle relative to the first direction 308. The sectioning process can create precursor shaped abrasive particles 321 having a generally quadrilateral polygonal shape as viewed in the plane defined by the length and width of the sheet 111. Furthermore, depending upon the sectioning process, a different type of precursor shaped abrasive particles 322 can be created in the same sectioning process used to create the precursor shaped abrasive particles 321. Notably, the precursor shaped abrasive particles 322 can be a different as compared to the precursor shaped abrasive particles 321 in terms of two-dimensional shape, size, and a combination thereof. For example, the precursor shaped abrasive particles 322 can have a greater volume as compared to the precursor shaped abrasive particles 321.

Referring again to FIG. 1, the system 100 can further include an application zone 131. As illustrated, a portion of the sheet 111 may be translated through the application zone 131 via the belt 109. The application zone 131 may be used for applying a material to the exterior surface of the form or the precursor shaped abrasive particles 123. In accordance with an embodiment, a dopant material may be applied to an exterior surface of the sheet 111. More particularly, as illustrated, in FIG. 1, the application zone 131 can be positioned after the forming zone 121. As such, the process of applying a dopant material may be completed on the precursor shaped abrasive particles 123. However, it will be appreciated that the application zone 131 may be positioned in other places within the system 100. For example, the application zone may be placed before the shaping zone 113. In such instances, applying a dopant material may be conducted before shaping. Alternatively, the process of applying a dopant material can be completed before forming the precursor shaped abrasive particles 123. In yet other instances, which will be described in more detail herein, the process of applying a dopant material may be conducted simultaneously with a process of forming the precursor shaped abrasive particles 123.

Within the application zone 131 a dopant material may be applied utilizing various methods including for example, spraying, dipping, depositing, impregnating, transferring, punching, cutting, pressing, crushing, and any combination thereof. In particular instances, the application zone 131 may utilize a spray nozzle, or a combination of spray nozzles 132 and 133 to spray dopant material onto the precursor shaped abrasive particles 123.

In accordance with an embodiment, applying a dopant material can include the application of a particular material, such as a precursor. In certain instances, the precursor can be a salt that includes a dopant material to be incorporated into the finally-formed shaped abrasive particles. For example, the metal salt can include an element or compound that is the precursor to the dopant material. It will be appreciated that the salt material may be in liquid form, such as in a dispersion comprising the salt and liquid carrier. The salt may include nitrogen, and more particularly, can include a nitrate. In other embodiments, the salt can be a chloride, sulfate, phosphate, and a combination thereof. In one embodiment, the salt can include a metal nitrate, and more particularly, consist essentially of a metal nitrate.

In one embodiment, the dopant material can include an element or compound such as an alkali element, alkaline earth element, rare earth element, hafnium, zirconium, niobium, tantalum, molybdenum, vanadium, or a combination thereof. In one particular embodiment, the dopant material includes an element or compound including an element such as lithium, sodium, potassium, magnesium, calcium, strontium, barium, scandium, yttrium, lanthanum, cesium, praseodymium, niobium, hafnium, zirconium, tantalum, molybdenum, vanadium, chromium, cobalt, iron, germanium, manganese, nickel, titanium, zinc, and a combination thereof.

In particular instances, the process of applying a dopant material can include select placement of the dopant material on an exterior surface of the sheet 111 or an exterior surface of a precursor shaped abrasive particle 123. For example, the process of applying a dopant material can include the application of a dopant material to an upper surface of the sheet 111. In alternative embodiments, the bottom surface of the sheet 111 may be treated to include a dopant material. In still other embodiments, a side surface of the sheet 111, defined by the thickness 181 can be treated such that a dopant material is applied thereto. It will be appreciated that various methods may be used to apply the dopant material to various exterior surfaces of the sheet 111 or precursor shaped abrasive particles 123. For example, a spraying process may be used to apply a dopant material to an upper surface or side surface of the sheet 111. Still, in an alternative embodiment, a dopant material may be applied to the bottom surface of the sheet 111 or bottom surface of precursor shaped abrasive particles 123 through a process such as dipping, depositing, impregnating, or a combination thereof. It will be appreciated that a surface of the belt 109 may be treated with dopant material to facilitate a transfer of the dopant material to a bottom surface of the sheet 111 or a bottom surface of precursor shaped abrasive particles 123.

Figure 4:
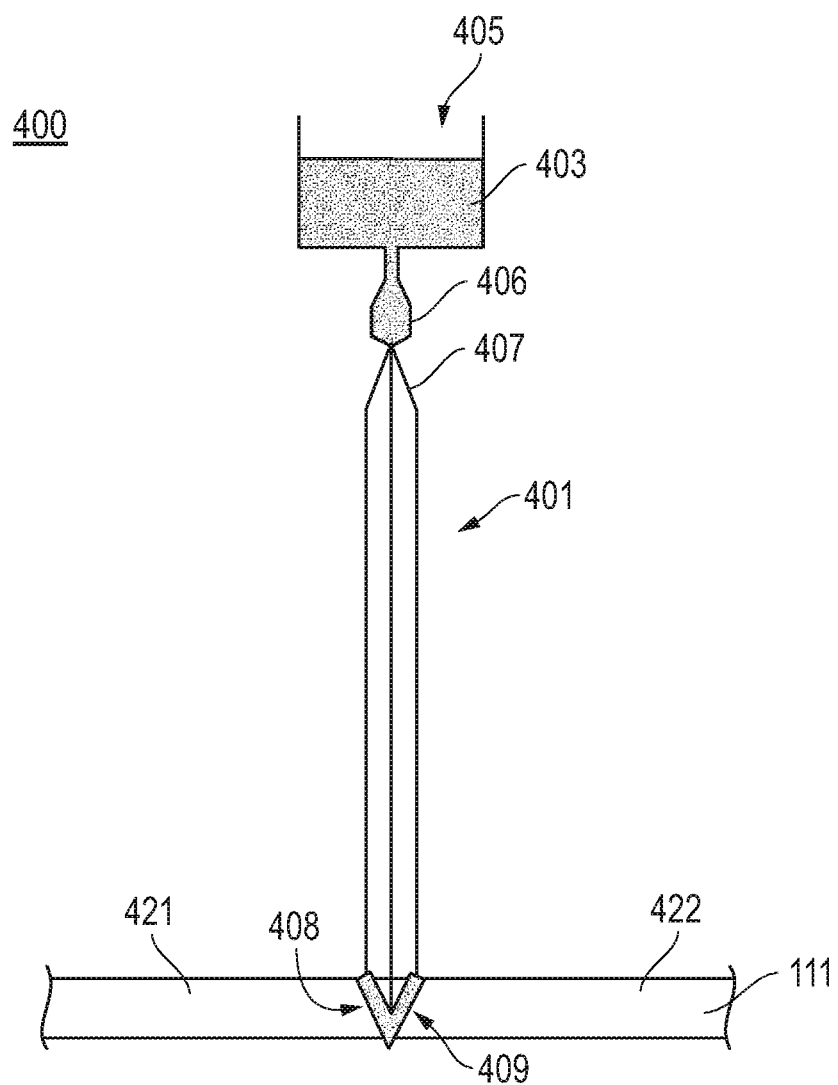
FIG. 4 includes an illustration of a portion of a system used in forming a particulate material in accordance with an embodiment.

FIG. 4 includes an illustration of a system that may be utilized to apply a dopant material in accordance with an embodiment. Notably, the system 400 may be combined with the forming process such that the sectioning of the sheet 111 and applying a dopant material may be conducted simultaneously. As illustrated, the system 400 can include a tool 401 facilitating sectioning of the sheet 111 into precursor shaped abrasive particles 421 and 422. As further illustrated, the system 400 can include a reservoir 403 proximate to the tool 401 that contains a content of dopant material 405.

As further illustrated, the system 400 can include an applicator 406 proximate to a surface 407 of the tool 401 that is configured to contact the sheet 111 and facilitate sectioning of the sheet 111 into precursor shaped abrasive particles 421 and 422. In accordance with an embodiment, the dopant material 405 can be applied to the surface 407 of the tool 401 and thus while the tool is sectioning the sheet 111 into precursor shaped abrasive particles 421 and 422 the dopant material 405 can be delivered to the side surfaces 408 and 409 of the precursor shaped abrasive particles 421 and 422. As such, the system 400 provides a method of simultaneously forming precursor shaped abrasive particles and applying a dopant material. It will be appreciated that the system 400 is a single embodiment, and other methods of applying a dopant material 405 to surfaces of tools 401 utilized in sectioning of the sheet 111 may be contemplated.

Referring again to FIG. 1, after forming precursor shaped abrasive particles 123, the particles may be translated through a post-forming zone 125. Various processes may be conducted in the post-forming zone 125, including for example, heating, curing, vibration, impregnation, doping, and a combination thereof.

In one embodiment, the post-forming zone 125 includes a heating process, wherein the precursor shaped abrasive particles 123 may be dried. Drying may include removal of a particular content of material, including volatiles, such as water. In accordance with an embodiment, the drying process can be conducted at a drying temperature of not greater than about 300° C., such as not greater than about 280° C., or even not greater than about 250° C. Still, in one non-limiting embodiment, the drying process may be conducted at a drying temperature of at least about 50° C. It will be appreciated that the drying temperature may be within a range between any of the minimum and maximum temperatures noted above.

Furthermore, the precursor shaped abrasive particles 123 may be translated through a post-forming zone at a particular rate, such as at least about 0.2 feet/min and not greater than about 8 feet/min.

Furthermore, the drying process may be conducted for a particular duration. For example, the drying process may be not greater than about six hours.

After the precursor shaped abrasive particles 123 are translated through the post-forming zone 125, the particles may be removed from the belt 109. The precursor shaped abrasive particles 123 may be collected in a bin 127 for further processing.

In accordance with an embodiment, the process of forming shaped abrasive particles may further comprise a sintering process. For certain processes, sintering can be conducted after collecting the precursor shaped abrasive particles 123 from the belt 109. Alternatively, the sintering may be a process that is conducted while the precursor shaped abrasive particles 123 are on the belt. Sintering of the precursor shaped abrasive particles 123 may be utilized to densify the particles, which are generally in a green state. In a particular instance, the sintering process can facilitate the formation of a high-temperature phase of the ceramic material. For example, in one embodiment, the precursor shaped abrasive particles 123 may be sintered such that a high-temperature phase of alumina, such as alpha alumina is formed. In one instance, a shaped abrasive particle can comprise at least about 90 wt % alpha alumina for the total weight of the particle. In other instances, the content of alpha alumina may be greater, such that the shaped abrasive particle may consist essentially of alpha alumina.

FIG. 1B includes an alternative system for forming a particulate material in accordance with an embodiment. The system 150 can generally be referred to as a screen printing process. The screen printing process can include extruding the mixture 101 from a die 103 through a die opening 105 in the direction 191. In particular, the screen printing process may utilize a screen 151 such that upon extruding the mixture 101 through the die opening 105 the mixture 101 can be forced through an opening 152 in the screen 151.

Referring briefly to FIG. 1C, a portion of a screen 151 is illustrated. As shown, the screen 151 can include an opening 152, and more particularly, a plurality of openings 152 extending through the volume of the screen 151. In accordance with an embodiment, the openings 152 can have a two-dimensional shape as viewed in a plane defined by the length (l) and width (w) of the screen that include various shapes, for example, polygons, ellipsoids, numerals, Greek alphabet letters, Latin alphabet letters, Russian alphabet characters, complex shapes including a combination of polygonal shapes, and a combination thereof. In particular instances, the openings 152 may have two-dimensional polygonal shapes such as, a triangle, a rectangle, a quadrilateral, a pentagon, a hexagon, a heptagon, an octagon, a nonagon, a decagon, and a combination thereof.

Referring again to FIG. 1B, after forcing the mixture 101 through the die opening 105 and a portion of the mixture 101 through the openings 152 in the screen 151, precursor shaped abrasive particles 153 may be printed on a belt 109 disposed under the screen 151. According to a particular embodiment, the precursor shaped abrasive particles 123 can have a shape substantially replicating the shape of the openings 152. Notably, the mixture 101 can be forced through the screen in rapid fashion, such that the average residence time of the mixture 101 within the openings 152 can be less than about 2 minutes, less than about 1 minute, less than about 40 second, or even less than about 20 seconds. In particular non-limiting embodiments, the mixture 101 may be substantially unaltered during printing as it travels through the screen openings 152, thus experiencing no change in the amount of components, and may experience no appreciable drying in the openings 152 of the screen 151.

During operation of the system 150, the screen 151 can be translated in a direction 153 while the belt 109 can be translated in a direction 110 substantially similar to the direction 153 to facilitate a continuous printing operation. As such, the precursor shaped abrasive particles 153 may be printed onto the belt 109 and translated along the belt to undergo further processing. It will be appreciated that further processing can include processes described in the embodiments herein, including for example, shaping, applying a dopant material, drying, and the like. In fact, as illustrated, the precursor shaped abrasive particles 123 may be translated through a shaping zone, wherein at least one exterior surface of the particles may be shaped as described in embodiments herein. The precursor shaped abrasive particles 123 may be translated through an application zone 131 wherein a dopant material can be applied to at least one exterior surface of the particles as described in embodiments herein. And further, the precursor shaped abrasive particles 123 may be translated on the belt 109 through a post-forming zone 125 wherein a variety of processes, including for example, drying, may be conducted on the precursor shaped abrasive particles 123 as described in embodiments herein.

Figure 5A:
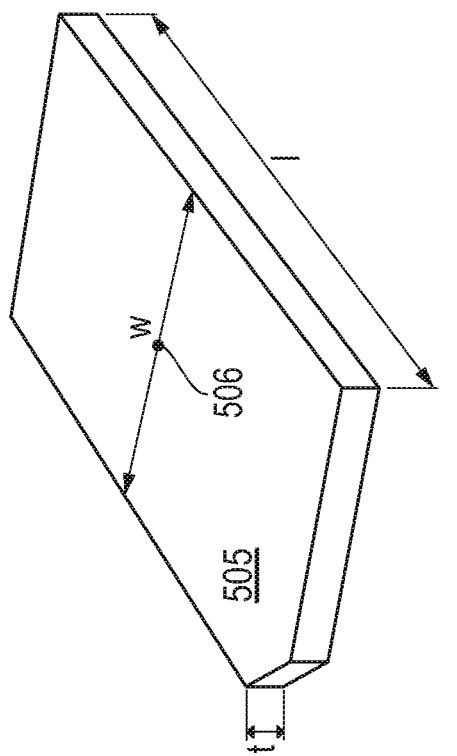
FIG. 5A through 5C include perspective view illustrations of shaped abrasive particles in accordance with an embodiment.

FIG. 5A includes a perspective view illustration of a shaped abrasive particle in accordance with an embodiment. The shaped abrasive particles of the embodiments herein can have a body defined by a length (l), which can be the longest dimension of any side of the shaped abrasive particle, a width (w) defined as a longest dimension of the shaped abrasive particle through a midpoint of the shaped abrasive particle, and a thickness (t) defined as the shortest dimension of the shaped abrasive particle extending in a direction perpendicular to the length and width. In specific instances, the length can be greater than or equal to the width. Moreover, the width can be greater than or equal to the thickness.

Additionally, the body of the shaped abrasive particles can have particular two-dimensional shapes. For example, the body can have a two-dimensional shape as viewed in a plane define by the length and width having a polygonal shape, ellipsoidal shape, a numeral, a Greek alphabet character, Latin alphabet character, Russian alphabet character, complex shapes utilizing a combination of polygonal shapes and a combination thereof. Particular polygonal shapes include triangular, rectangular, quadrilateral, pentagon, hexagon, heptagon, octagon, nonagon, decagon, any combination thereof.

FIG. 5 includes a perspective view illustration of a shaped abrasive particle in accordance with an embodiment. As illustrated, the shaped abrasive particle can have a corner-truncated triangular shape. In particular, the body 801 of the shaped abrasive particle can have a length (l), a width (w) extending through a midpoint 802 of the body 801, and a thickness (t). In accordance with an embodiment, the body 501 can have a primary aspect ratio defined as a ratio of length:width. In certain instances, the primary aspect ratio of the body 501 can be at least about 1.2:1, such as at least about 1.5:1, at least about 2:1, at least about 3:1, or even at least about 4:1. Still, the primary aspect ratio may be not greater than about 100:1. It will be appreciated that the primary aspect ratio of the body 501 may be within a range between any of the minimum and maximum ratios noted above.

Furthermore, the body 501 can have a secondary aspect ratio defined by a ratio of length:thickness. In certain instances, the secondary aspect ratio of the body 501 may be at least about 1.2:1, such as at least about 1.5:1, at least about 2:1, at least about 3:1, at least about 4:1, at least about 5:1, or even at least about 10:1. Still, in at least one non-limiting embodiment, the body 501 can have a secondary aspect ratio that is not greater than about 100:1. It will be appreciated that the secondary aspect ratio may be within a range between any of the minimum and maximum ratios provided above.

Furthermore, the shaped abrasive particles of the embodiments herein can have a tertiary aspect ratio defined by a ratio of the width:thickness. In certain instances, the tertiary aspect ratio of the body 501 may be at least about 1.2:1, such as at least about 1.5:1, at least about 2:1, at least about 3:1, at least about 4:1, at least about 5:1, or even at least about 10:1. Still, in at least one non-limiting embodiment, the body 501 can have a tertiary aspect ratio that is not greater than about 100:1. It will be appreciated that the tertiary aspect ratio may be within a range between any of the minimum and maximum ratios provided above.

Figure 5C:
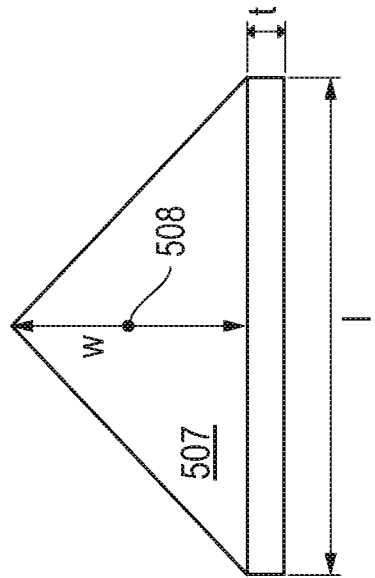
Figure 5B:
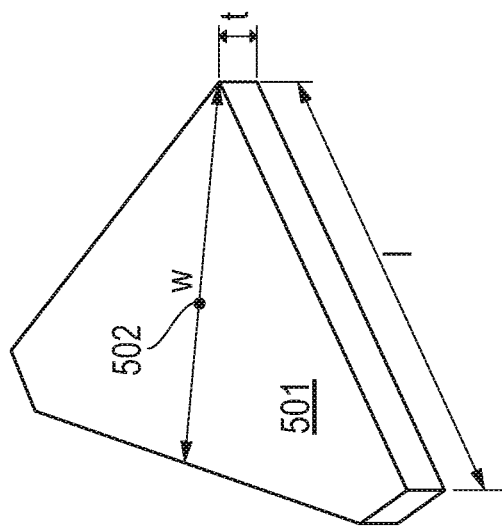

FIG. 5B includes a perspective view illustration of a shaped abrasive particle formed in accordance with an embodiment. Notably, the body 505 can have a generally quadrilateral shape. However, in one particular embodiment, the body 505 may be a corner truncated quadrilateral, and more particularly a corner truncated parallelogram or trapezoidal shape. The body 505 can have the any of the features of any shaped abrasive particle described in the embodiments herein.

FIG. 5C includes a perspective view illustration of a shaped abrasive particle formed in accordance with an embodiment. Notably, the body 507 can have a generally polygonal shape, and more particularly a triangular two-dimensional shape as viewed in a plane defined by the length (l) and width (w). The body 507 can have the any of the features of any shaped abrasive particle described in the embodiments herein.

The processes described herein can facilitate the formation of a particulate material having certain characteristics. In particular instances, the dopant material applied to the form or precursor shaped abrasive particle may reside at particular locations in the finally-formed shaped abrasive particles. For example, the amount of dopant at an exterior surface can be greater than the amount of dopant in a central region of the body. Alternatively, the amount of dopant at a central region can be greater than the amount of dopant present at the exterior surface.

FIG. 6 includes a cross-sectional illustration of a portion of a shaped abrasive particle in accordance with an embodiment. As illustrated, the shaped abrasive particle of FIG. 6 includes a body 601 having an upper surface 603 and a bottom surface 605 separated from the upper surface 603 by side surfaces 604 and 606. As described herein, the processes may include the application of a dopant material to an exterior surface of a form or a precursor shaped abrasive particle.

For certain particles herein, an exterior surface of the body 601, such as the upper surface 603 can contain a first amount of dopant material. Additionally, the body 601 can be formed such that a midpoint 602 representing a geometric center of the body can have a particular amount of the dopant material. Notably, the amount of dopant material at an exterior surface, such as the upper surface 603, can differ from the amount of dopant present at the central region of the shaped abrasive particle including the geometric center 602.

The body 601 can be formed such that an exterior surface, such as the upper surface 603, can have a particular content of a dopant material 610. Furthermore, the central region including the geometric center 602 can contain a different amount of the dopant material 610 as compared to the amount of dopant material at an exterior surface. In particular instances, the difference in the amount of dopant material at the upper surface 603 versus the central region including the geometric center 602 can be at least about 0.2 wt %, such as least about 0.6 wt %, at least about 1 wt %, at least about 1.4 wt %, at least about 1.8 wt %, at least about 2 wt %, at least about 2.5 wt %, at least about 3 w %, at least about 3.5 wt %, at least about 4 wt %, or even at least about 5 wt % for the total amount of dopant present within the body 601. Still, according to one non-limiting embodiment, the total difference in the amount of dopant material between the upper surface 603 and a central region including the geometric center 602 of the body 601 can be not greater than about 30 wt %, such as not greater than about 26 wt %, not greater than about 24 wt %, not greater than about 20 wt %, not greater than about 18 wt %, or even not greater than about 16 wt % for the total weight of the body. The difference in the amount of dopant material between an exterior surface and a central region can be within a range between any of the minimum and maximum percentages noted above.

In an alternative embodiment, the body 601 can have a difference in dopant concentration between an exterior surface and a central region including the geometric center 602. In particular instances, the difference in the concentration of dopant material at the upper surface 603 versus the central region can be at least 5%, as defined by the equation $[(C1-C2)/C1] \times 100\%$, wherein C1 is the region of higher concentration of dopant material and C2 is the region of lower dopant material concentration. In other instances, the difference in concentration can be greater, such as at least about 10%, at least about 20%, at least about 30%, at least about 40%, at least about 50%, at least about 60%, at least about 70%, at least about 80%, or even at least about 90%. Still, in other instances, the difference may be not greater than about 95%, not greater than about 85%, not greater than about 75%, not greater than about 65%, not greater than about 55%, not greater than about 45%, not greater than about 35%, not greater than about 25%, or even not greater than about 15%. It will be appreciated that the difference in dopant concentration between an exterior surface and a central region can be within a range between any of the minimum and maximum percentages noted above.

It will be appreciated, that in certain instances, the central region including the geometric center 602 of the body 601 may have a particularly low content of dopant material and may even be essentially free of a dopant material.

In another embodiment, the distribution of dopant material within the body 601 can include the incorporation of two different dopant materials. For example, the upper surface 603 of the body 601 can include a first type of dopant, and the central region including the geometric center 602 can include a second type of dopant that is different than the first type of dopant. In accordance with an embodiment, the first dopant material can include an element or compound such as an alkali element, alkaline earth element, rare earth element, hafnium, zirconium, niobium, tantalum, molybdenum, vanadium, or a combination thereof. In one particular embodiment, the dopant material includes an element or compound including an element such as lithium, sodium, potassium, magnesium, calcium, strontium, barium, scandium, yttrium, lanthanum, cesium, praseodymium, niobium, hafnium, zirconium, tantalum, molybdenum, vanadium, and a combination thereof.

The second dopant material can include an element or compound such as an alkali element, alkaline earth element, rare earth element, hafnium, zirconium, niobium, tantalum, molybdenum, vanadium, or a combination thereof. In one particular embodiment, the dopant material includes an element or compound including an element such as lithium, sodium, potassium, magnesium, calcium, strontium, barium, scandium, yttrium, lanthanum, cesium, praseodymium, niobium, hafnium, zirconium, tantalum, molybdenum, vanadium, and a combination thereof.

In certain instances, the body 601 of the shaped abrasive particle can be formed such that it has a particular content of dopant material at specific locations in the body 601. For example, the body may include not greater than about 12 wt % of the first dopant material 610 at the upper surface 603. In other instances, the amount of dopant material 610 at the upper surface 603 can be less, such as not greater than about 11 wt %, not greater than about 10 wt %, not greater than about 9 wt %, not greater than about 8 wt %, not greater than about 7 wt %, not greater than about 6 wt %, or even not greater than about 5 wt % for the total weight of the body 601. In at least one non-limiting embodiment, the amount of dopant material 610 at the upper surface 603 can be at least about 0.5 wt %, such at least about 1 wt %, at least about 1.3 wt %, at least about 1.8 wt %, at least about 2 wt %, at least about 2.3 wt %, at least about 2.8 wt %, or even at least about 3 wt % for the total weight of the body 601. It will be appreciated that the amount of dopant material 601 at the upper surface 603 can be within a range between any of the minimum or maximum percentages noted above.

In accordance with another embodiment, the amount of dopant material contained in the central region including the geometric center 602 of the body 601 that is spaced apart from the upper surface 603 can be not greater than about 12 wt % for the total weight of the body 601. In other instances, the amount of dopant material 610 at the central region including the geometric center 602 can be less, such as not greater than about 11 wt %, not greater than about 10 wt %, not greater than about 9 wt %, not greater than about 8 wt %, not greater than about 7 wt %, not greater than about 6 wt %, or even not greater than about 5 wt % for the total weight of the body 601. In at least one non-limiting embodiment, the amount of dopant material 610 at the central region including the geometric center 602 can be at least about 0.5 wt %, such at least about 1 wt %, at least about 1.3 wt %, at least about 1.8 wt %, at least about 2 wt %, at least about 2.3 wt %, at least about 2.8 wt %, or even at least about 3 wt % for the total weight of the body 601. It will be appreciated that the amount of dopant material 601 at the central region including the geometric center 602 can be within a range between any of the minimum or maximum percentages noted above.

In accordance with other embodiments, the body can be formed to have a dopant material at other exterior surfaces. For example, as illustrated the bottom surface 605 can include a dopant material 612. In one embodiment, the dopant material 612 can be the same dopant material 610 present at the upper surface 603. However, alternatively the dopant material 612 can be a different material as compared to the dopant material 610 at the upper surface 603. Moreover, it will be appreciated that the body 601 can be formed such that only the bottom surface 605 contains a dopant material 612 and the upper surface 603 and side surfaces 604 and 606 may be essentially free of dopant material.

The bottom surface 605 can be formed such that it contains a particular content of dopant material 612 as compared to the amount of dopant material at any other exterior surface or the central region including the geometric center 602 of the body 601. The bottom surface 605 can have a difference in the amount or concentration of dopant material 612 as compared to another exterior surface or the central region as described in other embodiments herein. Moreover, the total content of dopant material 612 at the bottom surface 605 can be substantially the same as described in embodiments herein.

As further illustrated, the side surface 604 can include a content of dopant material 611. The amount of dopant material 611 at the side surface 604 can differ from the amount of dopant material anywhere else in the body, including any other exterior surfaces or the central region. Furthermore, it will be appreciated that the body 601 can be formed such that substantially only the side surface 604 comprises dopant material 611 and all other exterior surfaces and the central region including the geometric center 602 may be essentially free of the dopant material.

The side surfaces 604 can differ in the amount of dopant material 611 as compared to any other exterior surface or the central region as described in other embodiments herein.

Moreover, the total content of dopant material 611 at the side surface 604 can be the same as described in embodiments herein.

The side surface 606 can include a content of dopant material 613. The amount of dopant material 613 can differ from the amount of dopant material anywhere else in the body, including any other exterior surfaces or the central region. Furthermore, it will be appreciated that the body 601 can be formed such that substantially only the side surface 606 comprises dopant material 613 and all other exterior surfaces and the central region including the geometric center 602 may be essentially free of the dopant material.

The side surfaces 606 can differ in the amount of dopant material 613 as compared to any other exterior surface or the central region as described in other embodiments herein. Moreover, the total content of dopant material 613 at the side surface 606 can be the same as described in embodiments herein.

The shaped abrasive particles of the embodiments herein may utilize various textures on various exterior surfaces. For example, suitable textures can include one or more features including protrusions, grooves, ridges, scales, and a combination thereof. In certain instances, the shaped abrasive particles of the embodiments can be characterized by an exterior surface having a pattern of protrusions and grooves. It will be appreciated that the shaped abrasive particles herein may incorporate a patterned surface that can be defined by a regular and repeating array of features. Alternatively, the textured surface can be defined by an irregular arrangement of features relative to each other.

FIG. 7A includes a perspective view illustration of a shaped abrasive particle in accordance with an embodiment. The shaped abrasive particle 700 can have a generally triangular shape, which is one of many exemplary two-dimensional shapes of the shaped abrasive particles herein. In accordance with an embodiment, the body 701 of the shaped abrasive particle 700 can include an exterior surface, and particularly, an upper surface 703 having a particular texture 702. The provision of a texture 702 on one or more exterior surfaces may facilitate improved performance of the shaped abrasive particles. As illustrated, the texture 702 can be defined by a plurality of features including protrusions 721 and grooves 722 extending between each other and along the upper surface 703 of the body 701.

FIG. 7B includes a cross-sectional illustration of a portion of the shaped abrasive particle of FIG. 7A as viewed in a plane defined by the thickness and width of the body 701 along axis 750. As illustrated, the upper surface 703 can have a texture 702 defined by plurality of protrusions 721, and grooves 722 extending between the protrusions, wherein the protrusions 721 and grooves 722 define peaks and valleys along the upper surface 703. In accordance with an embodiment, the upper surface 703 can have a texture 702 that is different than any other exterior surface of the body 701, including the texture of the bottom surface 705, side surface 704, or side surface 706. It will be appreciated that while the upper surface 703 is illustrated as having a texture 702, any of the other surfaces may have the same texture or a different texture. As such, in certain instances, the body can include a texture along a plurality of the exterior surfaces.

In particular instances, the features forming the texture 702 can have particular shapes and dimensions. For example, the features, such as the protrusions 721 and grooves 722 can have a generally similar size and shape. However, in certain instances, the features (e.g., protrusions and grooves 721 and 722) can have significantly different shapes and contours with respect to each other. In one embodiment, at least one of the protrusions can be significantly greater in size in terms of height and/or width. Moreover, at least one of the grooves 722 can differ from the other grooves with respect to depth and/or width.

The body 701 of the shaped abrasive particle 700 can include an upper surface 703 having a dopant material 710. In particular instances, the dopant material 710 can be provided on the upper surface 703 in a matter that compliments the texture 702. For example, in certain instances the dopant material can have a first concentration at a first feature of the texture 702 and a second concentration at a second feature of the texture 702. In more particular instances, the dopant material 710 can have a greater concentration within one or more grooves 722 as compared to the concentration of the dopant material 710 at one or more protrusions 721. In more particular instances, the amount of dopant material 710 can be greater in the grooves 722 as compared to the amount of dopant material 710 at the protrusions 721.

FIG. 8 includes a cross-sectional illustration of a portion of a shaped abrasive particle in accordance with an embodiment. Notably, the shaped abrasive particle can include a body 801 having a bottom surface 804, an upper major surface 802 opposite the bottom surface 804, and a side surface 803 joining the bottom surface 804 and upper major surface 802. As further illustrated, the body 801 can include a side surface 805 opposite the side surface 803 joining the bottom surface 804 and upper major surface 802. In accordance with a particular embodiment, the body 801 can have a curvilinear upper major surface 802. Notably, in some instances, the upper major surface 802 can have a convex contour such that the thickness of the body 801 at the midpoint ($t_m$) is greater than the thickness at either one of the side surfaces ($t_s$) 803 or 805. For some embodiments, the bottom surface 802 may be substantially planer as compared to the upper major surface 802.

FIG. 9 includes a cross-sectional illustration of an alternative shaped abrasive particle in accordance with an embodiment. Notably, the shaped abrasive particle can have a body 901 including a bottom surface 904, an upper major surface 902 opposite the bottom surface 904, and side surfaces 903 and 905 opposite each other and joining the bottom surface 905 and upper major surface 902. As illustrated, the body 901 can have a particularly unique contour, wherein the upper major surface 902 has a convex contour, and the bottom surface 904 also has a convex contour such that the thickness at the midpoint ($t_m$) is significantly greater than the thickness of the body 901 at the edges ($t_e$) defined by surfaces 901 and 905.

FIG. 10 includes a cross-sectional illustration of an alternative shaped abrasive particle in accordance with an embodiment. Notably, the shaped abrasive particle can have a body 1001 including a bottom surface 1004, an upper major surface 1002 opposite the bottom surface 1004, and side surfaces 1003 and 1005 opposite each other and separating the bottom surface 1004 and upper major surface 1002. As illustrated, the body 1001 can have a unique contour, wherein the upper major surface 1002 can have a concave contour and the bottom surface 1004 can have a substantially planar contour such that the thickness at the midpoint ($t_m$) is significantly less than the thickness of the body 1001 at the edges ($t_e$) defined by surfaces 1001 and 1005.

FIG. 11 includes a cross-sectional illustration of an alternative shaped abrasive particle in accordance with an embodiment. Notably, the shaped abrasive particle can have a body 1101 including a bottom surface 1104, an upper major surface 1102 opposite the bottom surface 1104, and side surfaces 11103 and 11105 opposite each other and separating the bottom surface 11104 and upper major surface 1102. As illustrated, the body 1101 can have a unique contour, wherein the upper major surface 1102 can have a concave contour and the bottom surface 1104 can have a concave contour such that the thickness at the midpoint ($t_m$) is significantly less than the thickness of the body 1101 at the edges ($t_e$) defined by surfaces 1101 and 1105.

In accordance with an embodiment, the shaped abrasive particles of the embodiments herein may be formed such that at least two exterior surfaces have significantly different two-dimensional shapes with respect to each other. In particular, the shaped abrasive particles can have a bottom major surface having a two-dimensional shape that is significantly different from a two-dimensional shape of an upper major surface. In more particular embodiments, the two-dimensional shapes can be any one of the two-dimensional shapes noted in the embodiments herein. For example, the bottom surface can be a first polygonal shape and the upper major surface can be a different polygonal shape.

Figure 12:
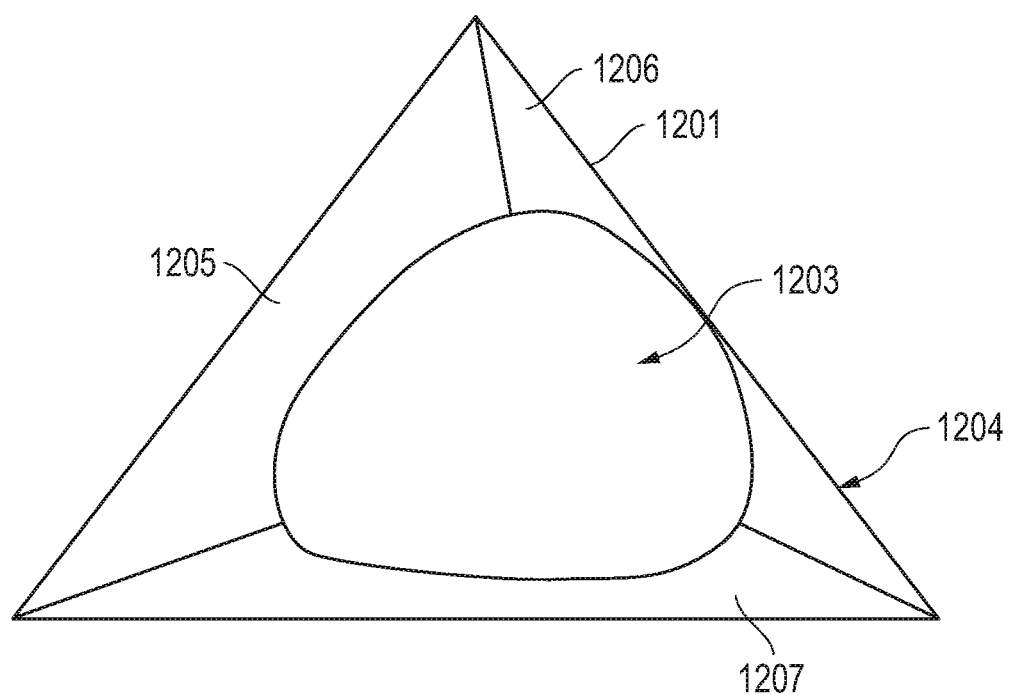
FIG. 12 includes a perspective view illustration of a shaped abrasive particle in accordance with an embodiment.

FIG. 12 includes a perspective view illustration of a shaped abrasive particle in accordance with an embodiment. The shaped abrasive particle 1200 includes a body 1201 having a bottom surface 1204 and an upper surface 1203 spaced away from the bottom surface 1204 by side surfaces 1205, 1206, and 1207. As illustrated in FIG. 12, the bottom surface 1204 can have a generally triangular shape, while the upper surface 1203 can have an ellipsoidal shape.

Figure 13A:
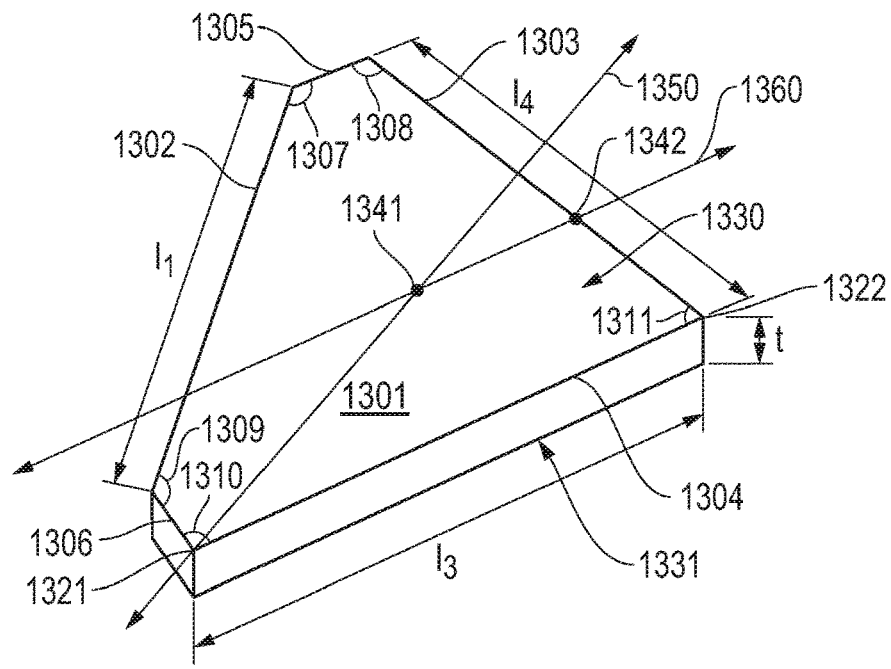
FIG. 13A includes a perspective view illustration of a particulate material in accordance with an embodiment.

FIG. 13A includes a perspective view illustration of a shaped abrasive particle in accordance with an embodiment. Notably, body 1301 can have a first long side 1302, a second long side 1303, and a third long side 1304. Furthermore, the body 1301 can include a first short side 1305 coupled to the first long side 1302 and second long side 1303. The body 701 may further include a second short side 1306 coupled to the first long side 1302 and third long side 1304. While the body 1301 of the shaped abrasive particle may be considered to have a generally pentagon shape as viewed in a plane defined by the length and width, in particular instances, the body 1301 can be defined as a corner truncated triangle, wherein the first short side 1305 and second short side 1306 define flat surfaces where otherwise a corner, such as corner 1322, would exist. Notably, such corner-truncated shapes may represent a significant portion of shaped abrasive particles in a batch, formed through the process described herein.

As illustrated, the body 1301 can have a first angle 1307 defined between the first long side 1302 and first short side 1305 as viewed at the upper major surface 1330 of the body 1301. In accordance with an embodiment, the first angle 1307 can be greater than about 90°. In more particular instances, the first angle 1307 can be at least about 92°, at least about 95°, at least about 100°, or even at least about 105°. Still, the first angle, in one non-limiting embodiment, can be not greater than about 160°.

The body can further include a second angle 1308 formed between the first short side 1305 and second long side 1303 as viewed at the upper major surface 1330 of the body 1301. In accordance with an embodiment, the second angle 1308 can be the same as the first angle 1307. Still, in another embodiment, the second angle 1308 can be different than the first angle 1307. According to one instance, the second angle 1308 can be obtuse. Alternatively, the second angle 1308 may be greater than about 90°, and more particularly, at least about 92°, at least about 95°, at least about 100°, or even at least about 105°. Still, the second angle 1308, in one non-limiting embodiment, can be not greater than about 160°.

As further illustrated, the body 1301 of the shaped abrasive particle can include a third angle 1309 defined as the angle between the second short side 1306 and first long side 1302 as viewed at the upper major surface 1330 of the body 1301. The third angle 1309 may be the same as the first angle 1307 or the second angle 1308. Alternatively, the third angle 1309 may be different than the first angle 1307 and second angle 1308.

The body 1301 can also include a fourth angle 1310 defined as the angle between the second short surface 706 and third long side 1304. The fourth angle 1310 may be different than the first angle 1307, second angle 1308, or third angle 1309. In particular instances, the fourth angle 1310 can be less than the first angle 1307, less than the second angle 1308, or less than the third angle 1309. In at least one particular embodiment, the fourth angle 1310 may be substantially orthogonal (90°). In yet other instances, the fourth angle 1310 may be greater than 90°.

The body 1301 may further include a fifth angle 1311 between the third long side 1304 and second long side 1303 as viewed top down looking at the upper major surface 1330 of the body 1301. Notably, the fifth angle 1311 can be different than the first angle 1307, the second angle 1308, the third angle 1309, or the fourth angle 1310. In particular instances, the fifth angle 1311 can be less than the first angle 1307, less than the second angle 1308, less than the third angle 1309, or even less than the fourth angle 1310. The fifth angle 1311 can define the corner 1322 of a triangle, and thus be less than about 90°, and more particularly less than about 70°. While the body 1301 has been illustrated as having a first short side and a second short side 1306, it will be appreciated that the body could incorporate a third short side separating the second long side and third long side 1304.

In accordance with an embodiment, the first short side 1305 can have a length that is not greater than about 60% of a length of the first long side 1302. In other embodiments, the length of the first short side 1305 relative to the first long side 1302 can be less, such as not greater than about 50%, or not greater than about 40%, not greater than about 30%, not greater than about 20%, or even not greater than about 15%. Still, the first short side 1305 can be at least about 2%, such as at least about 5%, at least about 10%, at least about 15%, or even at least about 20% of the length of the first long side 1302. It will be appreciated that the length of the first short side 1305 can be within a range between any of the minimum and maximum percentages noted above. Furthermore, it will be appreciated that the length of the second short side 1306 can have the same characteristics of the first short side 1305 relative to the first long side 1302. Additionally, the length of the second short side 1306 may differ with respect to the length of the first short side 1305.

In accordance with an embodiment, the first long side 1302 can have a length (l1) that is substantially equal to the length (l2) of the second long side 1303. Still, the length (l1) of the first long side 1302 may be significantly different than the length (l2) of the second long side 1303. Moreover, the length (l1) of the first long side 1302 may be substantially the same as the length (l3) of the third long side 1304. Alternatively, the length (l1) of the first long side 1302 may be significantly different that the length (l3) of the third long side 1304. Additionally, the length (l2) of the second long side 1303 may be substantially the same as the length (l3) of the third long side 1304. Alternatively, the length (l2) of the second long side 1303 may be significantly different than the length (l3) of the third long side 1304.

Figure 13B:
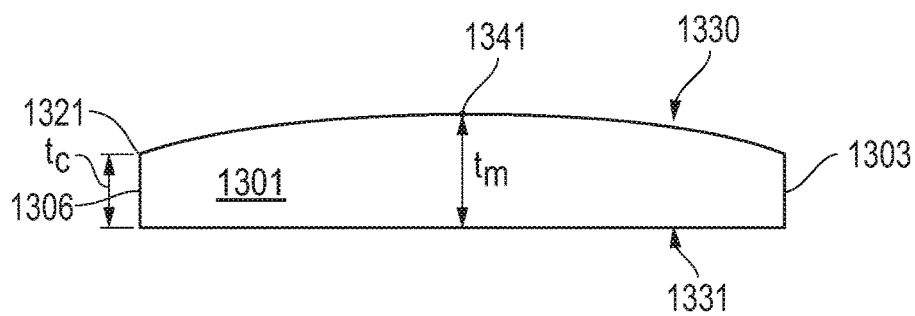
FIG. 13B includes a cross-sectional illustration of a portion of the shaped abrasive particle of FIG. 13A.

FIG. 13B includes a cross-sectional illustration of a portion of the shaped abrasive particle of FIG. 13A. Notably, the cross-sectional image is taken through the axis 1350 which is defined by a point at one corner 1321 of the body 1301 and a midpoint 1341 of the body 1301. In accordance with a particular embodiment, the body 1301 can have a greater thickness at a midpoint 1341 of the shaped abrasive particle as compared to the thickness of the body measured at the corner 1321. In certain instances, the shaped abrasive particles can have a corner/midpoint differential thickness of at least 1.1, wherein the corner/midpoint differential thickness (c/mot) is a measure of the thickness of the body at the midpoint divided by the thickness of at least one corner. In certain embodiments, the corner/midpoint differential thickness can be greater, such as at least about 1.2, at least about 1.4, wherein the at least about 1.6, at least about 1.8, at least about 2, at least about 2.2, at least about 2.4, at least about 3, or even at least about 4. Still, in one non-limiting embodiment, the corner/midpoint differential thickness (c/mΔt) can be not greater than about 20, such as not greater than about 18, not greater than about 15, not greater than about 12, not greater than about 10, not greater than about 8, not greater than about 6, or even not greater than about 4. It will be appreciated that the shaped abrasive particles herein can have a body having a corner/midpoint differential thickness (c/mΔt) within a range between any of the minimum and maximum values noted above.

It will be appreciated that the above characteristics can be attributed to a batch of shaped abrasive particles. The batch can include a sample of at least about 20 discrete shaped abrasive particles selected at random. Each of the discrete shaped abrasive particles of the sample can be measured to determine average dimensions of midpoint thickness and corner thickness of the sample that are representative of the batch.

Figure 13C:
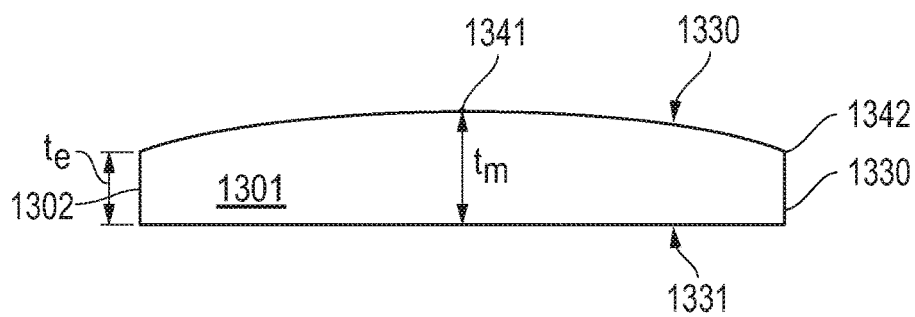
FIG. 13C includes a cross-sectional illustration of a portion of the shaped abrasive particle of FIG. 13A.

FIG. 13C includes a cross-sectional illustration of a portion of the shaped abrasive particle of FIG. 13A. In particular, FIG. 13C includes a cross-sectional illustration of the shaped abrasive particle along axis 1360, which is defined as an axis extending through the midpoint 1341 and a midpoint 1342 of a side 1303 of the body 1301. In accordance with one embodiment, the body 1301 can have a greater thickness at a midpoint 1341 of the body 1301 than a thickness at a midpoint edge 1342 of the body 1301. Notably, the shaped abrasive particles can have an edge/midpoint differential thickness (e/mΔt) of at least 1.1, wherein the edge/midpoint differential thickness is a measure of the thickness of the body at the midpoint 1341 divided by the thickness of a side surface at the midpoint between two corners. In other embodiments, the edge/midpoint differential thickness (e/mΔt) can be greater, such as at least about 1.2, at least about 1.4, wherein the at least about 1.6, at least about 1.8, at least about 2, at least about 2.2, at least about 2.4, at least about 3, or even at least about 4. Still, in one non-limiting embodiment, the edge/midpoint differential thickness (e/mΔt) can be not greater than about 20, such as not greater than about 18, not greater than about 15, not greater than about 12, not greater than about 10, not greater than about 8, not greater than about 6, or even not greater than about 4. It will be appreciated that the shaped abrasive particles herein can have a body having a edge/midpoint differential thickness (e/mΔt) within a range between any of the minimum and maximum values noted above.

It will be appreciated that the above characteristics can be attributed to a batch of shaped abrasive particles. The batch can include a sample of at least about 20 discrete shaped abrasive particles selected at random. Each of the discrete shaped abrasive particles of the sample can be measured to determine average dimensions of midpoint thickness and corner thickness of the sample that are representative of the batch.

The shaped abrasive particles of embodiments herein can have a particular size, as measured by the length of the body. For example, the shaped abrasive particles may have a median particle size of not greater than about 5 mm. Alternatively, the median particle may be less, such as not greater than about 4 mm, not greater than about 3 mm, not greater than about 2 mm, or even not greater than about 1.5 mm. In still another aspect, the median particle size of the shaped abrasive particles can be at least about 10 microns, at least about 100 microns, at least about 200 microns, at least about 400 microns, at least about 600 microns, or even at least about 800 microns. It will be appreciated that the median particle size of the shaped abrasive particles can be within a range between any of the above minimum and maximum values.

The shaped abrasive particles of embodiments herein can have a particular grain size, particularly for grains of alpha alumina. For example, the shaped abrasive particles may have an average grain size of not greater than about 500 microns, such as not greater than about 250 microns, or even not greater than about 100 microns, not greater than about 50 microns, not greater than about 20 microns, or even not greater than about 1 micron. In another aspect, the average grain size can be at least about 0.01 microns, such as at least about 0.05 microns, at least about 0.08 microns, or even at least about 0.1 microns. It will be appreciated that the average grain size of the shaped abrasive particles can be within a range between any of the above minimum and maximum values.

Figure 14:
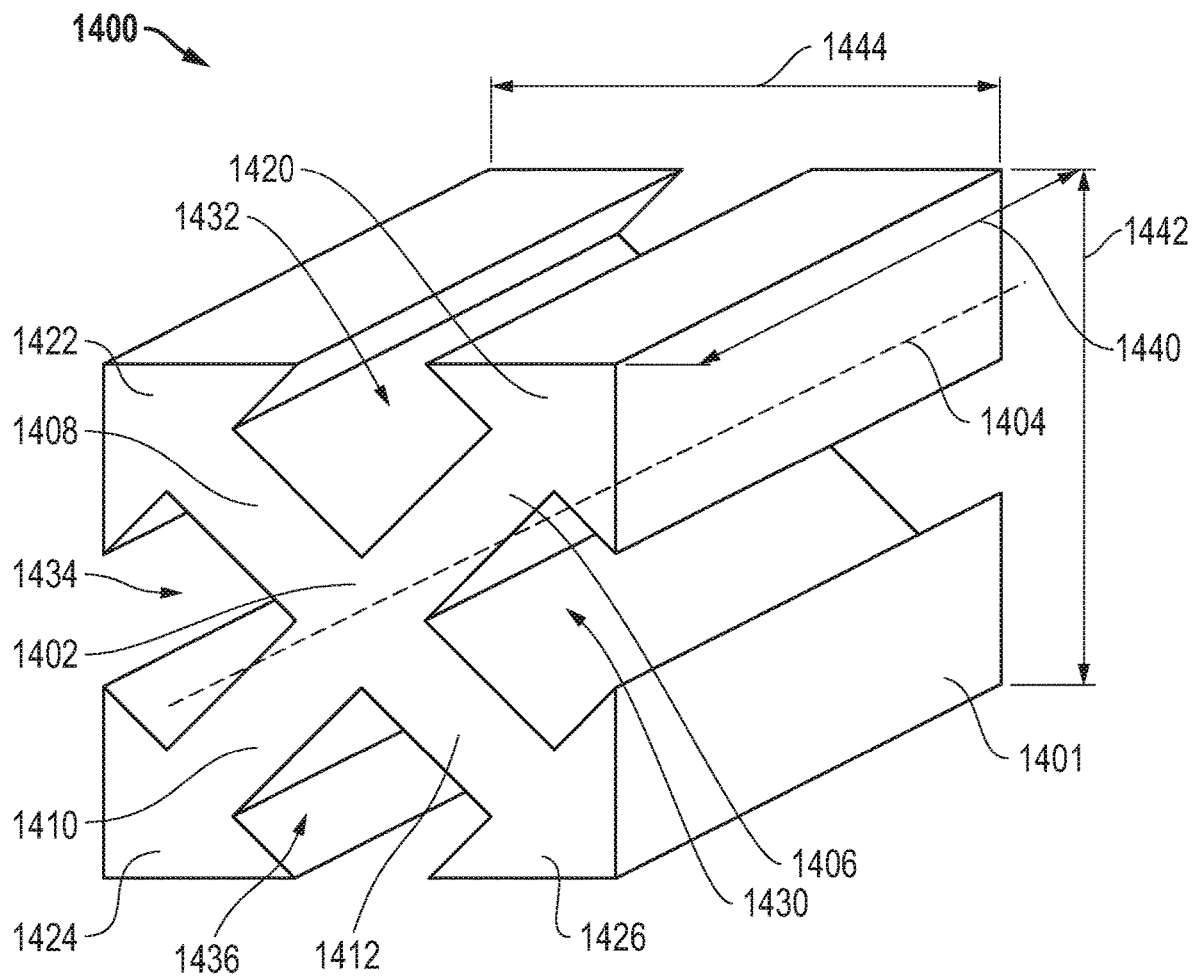
FIGS. 14-17 include illustrations of shaped abrasive particles according to embodiments.

FIG. 14 includes an illustration of a shaped abrasive particle according to another embodiment. As depicted, the shaped abrasive particle 11400 may include a body 1401 that may be formed according to an embodiment herein. Notably, the shaped abrasive particle may be formed from an extruded sheet via a punching process. The body 1401 can include a central portion 1402 that extends along a longitudinal axis 1404. A first radial arm 1406 may extend outwardly from the central portion 1402 along the length of the central portion 1402. A second radial arm 1408 may extend outwardly from the central portion 1402 along the length of the central portion 1402. A third radial arm 1410 may extend outwardly from the central portion 1402 along the length of the central portion 1402. Moreover, a fourth radial arm 1412 may extend outwardly from the central portion 1402 along the length of the central portion 1402. The radial arms 1406, 1408, 1410, 1412 may be equally spaced around the central portion 1402 of the shaped abrasive particle 1400.

As shown in FIG. 14, the first radial arm 1406 may include a generally arrow shaped distal end 1420. The second radial arm 1408 may include a generally arrow shaped distal end 1422. The third radial arm 1410 may include a generally arrow shaped distal end 1424. Further, the fourth radial arm 1412 may include a generally arrow shaped distal end 1426.

FIG. 14 also illustrates that the shaped abrasive particle 1400 may be formed with a first void 1430 between the first radial arm 1406 and the second radial arm 1408. A second void 1432 may be formed between the second radial arm 1408 and the third radial arm 1410. A third void 1434 may also be formed between the third radial arm 1410 and the fourth radial arm 1412. Additionally, a fourth void 1436 may be formed between the fourth radial arm 1412 and the first radial arm 1406.

Figure 15:
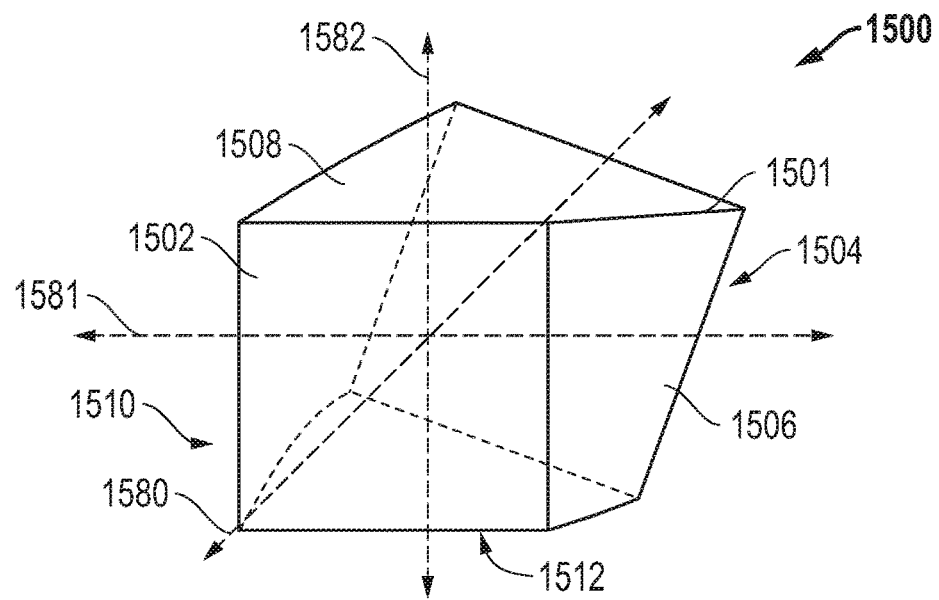
Figure 16:
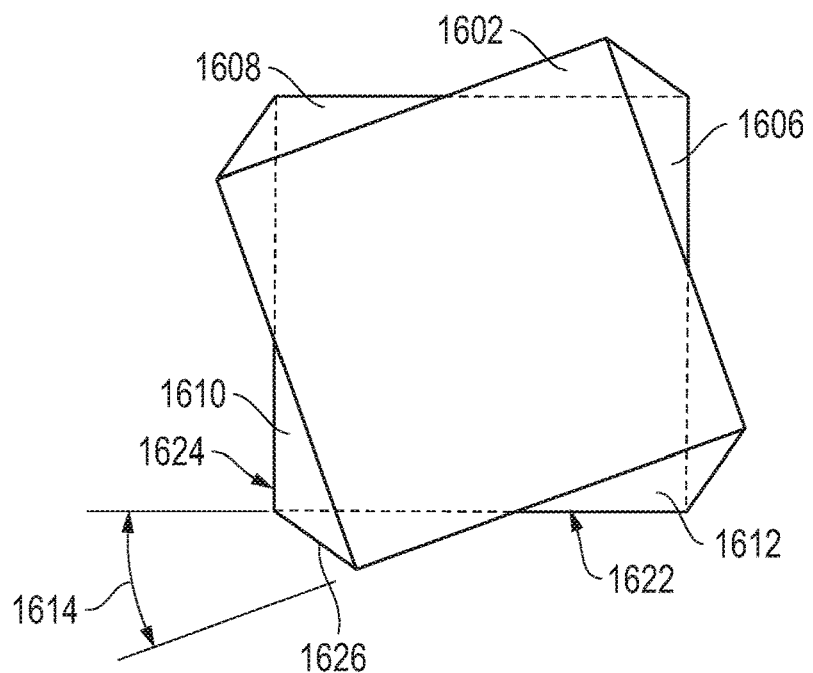

FIGS. 15 and 16 include an illustration of a shaped abrasive particle according to another embodiment. As shown, the shaped abrasive particle 1500 may include a body 1501 that has a generally cube-like shape. It will be appreciated that the shaped abrasive particle may be formed to have other polyhedral shapes. The body 1501 may have a first end face 1502 and a second end face 1504, a first lateral face 1506 extending between the first end face 1502 and the second end face 1504, a second lateral face 1508 extending between the first end face 1502 and the second end face 1504. Further, the body 1501 can have a third lateral face 1510 extending between the first end face 1502 and the second end face 1504, and a fourth lateral face 1512 extending between the first end face 1502 and the second end face 1504.

As shown, the first end face 1502 and the second end face 1504 can be parallel to each other and separated by the lateral faces 1506, 1508, 1510, and 1512, giving the body a cube-like structure. However, in a particular aspect, the first end face 1502 can be rotated with respect to the second end face 1504 to establish a twist angle 1514. In particular instances, the shaped abrasive particle 1500 can be formed from the processes described herein, including sectioning a sheet, and more particularly sectioning a sheet that has been torqued or twisted in a particular manner to impart a twist angle to the finally-formed shaped abrasive particle. In certain instances, the twist of the body 1501 can be along one or more axes and define particular types of twist angles. For example, as illustrated in a top-down view of the body in FIG. 12 looking down the longitudinal axis 1580 defining a length of the body 1501 on the end face 1502 parallel to a plane defined by the lateral axis 1581 extending along a dimension of width of the body 1501 and the vertical axis 1582 extending along a dimension of height of the body 1501. According to one embodiment, the body 1501 can have a longitudinal twist angle 1514 defining a twist in the body 1501 about the longitudinal axis such that the end faces 1502 and 1504 are rotated relative to each other. The twist angle 1514, as illustrated in FIG. 16 can be measured as the angle between a tangent of a first edge 1522 and a second edge 1524, wherein the first edge 1522 and second edge 1524 are joined by and share a common edge 1526 extending longitudinally between two of the lateral faces (1510 and 1512). It will be appreciated that other shaped abrasive particles can be formed to have twist angles relative to the lateral axis, the vertical axis, and a combination thereof. Any such twist angles can have a value as described in the embodiments herein.

In a particular aspect, the twist angle 1514 can be at least about 1°. In other instances, the twist angle 1514 can be greater, such as at least about 2°, at least about 5°, at least about 8°, at least about 10°, at least about 12°, at least about 15°, at least about 18°, at least about 20°, at least about 25°, at least about 30°, at least about 40°, at least about 50°, at least about 60°, at least about 70°, at least about 80°, or even at least about 90°. Still, according to certain embodiments, the twist angle 1514 can be not greater than about 360°, such as not greater than about 330°, such as not greater than about 300°, not greater than about 270°, not greater than about 230°, not greater than about 200°, or even not greater than about 180°. It will be appreciated that certain shaped abrasive particles can have a twist angle within a range between any of the minimum and maximum angles noted above.

Figure 17:
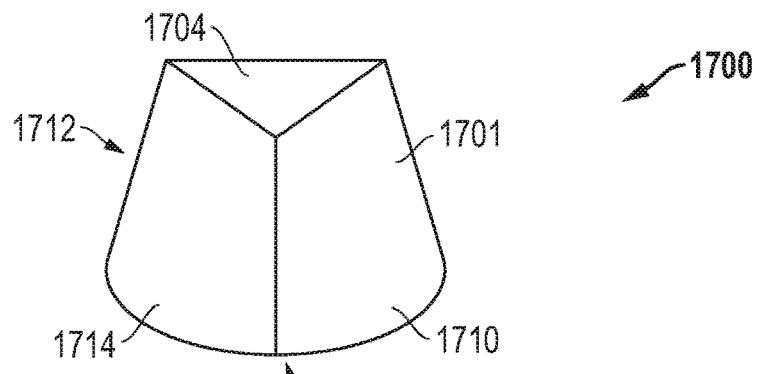

FIG. 17 includes an illustration of a shaped abrasive particle according to an embodiment. The shaped abrasive grain 1700 may include a body 1701 including a base surface 1702 and an upper surface 1704 separated from each other by one or more side surfaces 1710, 1712, and 1714. According to one particular embodiment, the body 1701 can be formed such that the base surface 1702 has a planar shape different than a planar shape of the upper surface 1704, wherein the planar shape is viewed in the plane defined by the respective surface. For example, as illustrated in the embodiment of FIG. 17, the body 1701 can have base surface 1702 generally have a circular shape and an upper surface 1704 having a generally triangular shape. It will be appreciated that other variations are feasible, including any combination of shapes at the base surface 1702 and upper surface 1704.

Figure 18:
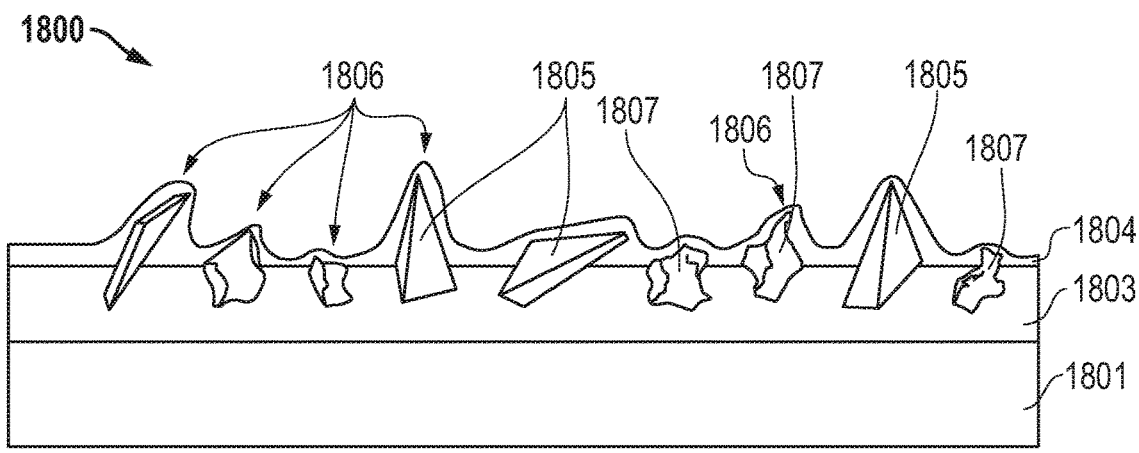
FIG. 18 includes a coated abrasive including shaped abrasive particles according to an embodiment.

FIG. 18 includes a cross-sectional illustration of a coated abrasive article incorporating the abrasive particulate material in accordance with an embodiment. As illustrated, the coated abrasive 1800 can include a substrate 1801 and a make coat 1803 overlying a surface of the substrate 1801. The coated abrasive 1800 can further include abrasive particulate material 1806. The abrasive particulate material can include a first type of shaped abrasive particle 1805, a second type of abrasive particulate material 1807 in the form of diluent abrasive particles having a random shape, which may not necessarily be shaped abrasive particles. The coated abrasive 1800 may further include size coat 1804 overlying and bonded to the abrasive particulate material 1806 and the make coat 1804.

According to one embodiment, the substrate 1801 can include an organic material, inorganic material, and a combination thereof. In certain instances, the substrate 1801 can include a woven material. However, the substrate 1801 may be made of a non-woven material. Particularly suitable substrate materials can include organic materials, including polymers, and particularly, polyester, polyurethane, polypropylene, polyimides such as KAPTON from DuPont, paper. Some suitable inorganic materials can include metals, metal alloys, and particularly, foils of copper, aluminum, steel, and a combination thereof.

The make coat 1803 can be applied to the surface of the substrate 1801 in a single process, or alternatively, the abrasive particulate material 1806 can be combined with a make coat 1803 material and applied as a mixture to the surface of the substrate 1801. Suitable materials of the make coat 1803 can include organic materials, particularly polymeric materials, including for example, polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof. In one embodiment, the make coat 1803 can include a polyester resin. The coated substrate can then be heated in order to cure the resin and the abrasive particulate material to the substrate. In general, the coated substrate 1801 can be heated to a temperature of between about 100° C. to less than about 250° C. during this curing process.

The abrasive particulate material 1806 can include shaped abrasive particles according to embodiments herein. In particular instances, the abrasive particulate material 1806 may include different types of shaped abrasive particles. The different types of shaped abrasive particles can differ from each other in composition, two-dimensional shape, three-dimensional shape, size, and a combination thereof as described in the embodiments herein. As illustrated, the coated abrasive 1800 can include a shaped abrasive particle 1805 having a generally triangular two-dimensional shape.

The other type of abrasive particles 1807 can be diluent particles different than the shaped abrasive particles 1805. For example, the diluent particles can differ from the shaped abrasive particles 1805 in composition, two-dimensional shape, three-dimensional shape, size, and a combination thereof. For example, the abrasive particles 1807 can represent conventional, crushed abrasive grit having random shapes. The abrasive particles 1807 may have a median particle size less than the median particle size of the shaped abrasive particles 1805.

After sufficiently forming the make coat 1803 with the abrasive particulate material 1806, the size coat 1804 can be formed to overlie and bond the abrasive particulate material 1806 in place. The size coat 1804 can include an organic material, may be made essentially of a polymeric material, and notably, can use polyesters, epoxy resins, polyurethanes, polyamides, polyacrylates, polymethacrylates, poly vinyl chlorides, polyethylene, polysiloxane, silicones, cellulose acetates, nitrocellulose, natural rubber, starch, shellac, and mixtures thereof.

Figure 19:
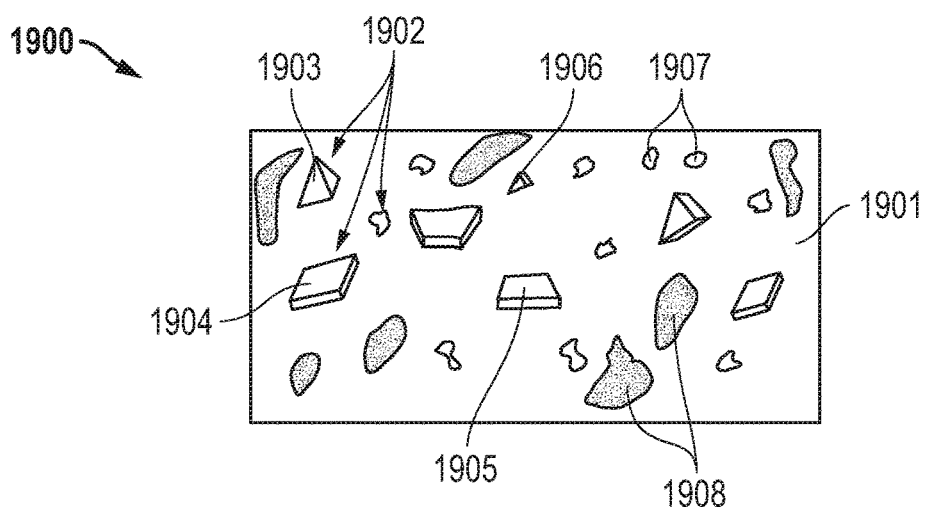
FIG. 19 includes a bonded abrasive including shaped abrasive particles according to an embodiment.

FIG. 19 includes an illustration of a bonded abrasive article incorporating the abrasive particulate material in accordance with an embodiment. As illustrated, the bonded abrasive 1900 can include a bond material 1901, abrasive particulate material 1902 contained in the bond material, and porosity 1908 within the bond material 1901. In particular instances, the bond material 1901 can include an organic material, inorganic material, and a combination thereof. Suitable organic materials can include polymers, such as epoxies, resins, thermosets, thermoplastics, polyimides, polyamides, and a combination thereof. Certain suitable inorganic materials can include metals, metal alloys, vitreous phase materials, crystalline phase materials, ceramics, and a combination thereof.

In some instances, the abrasive particulate material 1902 of the bonded abrasive 1900 can include shaped abrasive particles 1903. In particular instances, the shaped abrasive particles 1903 can be different types of particles, which can differ from each other in composition, two-dimensional shape, three-dimensional shape, size, and a combination thereof as described in the embodiments herein. Alternatively, the bonded abrasive article can include a single type of shaped abrasive particle.

The bonded abrasive 1900 can include a type of abrasive particulate material 1907 representing diluent abrasive particles, which can differ from the shaped abrasive particles 1903 in composition, two-dimensional shape, three-dimensional shape, size, and a combination thereof.

The porosity 1908 of the bonded abrasive 1900 can be open porosity, closed porosity, and a combination thereof. The porosity 1908 may be present in a majority amount (vol %) based on the total volume of the body of the bonded abrasive 1900. Alternatively, the porosity 1908 can be present in a minor amount (vol %) based on the total volume of the body of the bonded abrasive 1900. The bond material 1901 may be present in a majority amount (vol %) based on the total volume of the body of the bonded abrasive 1900. Alternatively, the bond material 1901 can be present in a minor amount (vol %) based on the total volume of the body of the bonded abrasive 1900. Additionally, abrasive particulate material 1902 can be present in a majority amount (vol %) based on the total volume of the body of the bonded abrasive 1900. Alternatively, the abrasive particulate material 1902 can be present in a minor amount (vol %) based on the total volume of the body of the bonded abrasive 1900.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Item 1. A particulate material comprising:
a shaped abrasive particle having a body comprising a length, a width, and a thickness, wherein the body comprises a central region including the geometric center of the body having a first dopant material present in a center dopant amount ($D_{Cc}$), the body further comprising an upper surface defined by the dimensions of length and width, the upper surface having a second dopant material present in an upper surface dopant amount ($D_{USc}$), wherein the body comprises a dopant amount difference ($\Delta D_c$) between the first dopant amount and the second dopant amount.

Item 2. The particulate material of item 1, wherein the first dopant amount is greater than the second dopant amount, wherein the second dopant amount is greater than the first dopant amount.

Item 3. The particulate material of item 1, wherein the first dopant material and second dopant material are different from each other.

Item 4. The particulate material of item 1, wherein the dopant amount difference is at least about 0.2 wt % or at least about 0.6 wt % or at least about 1 wt % or at least about 1.4 wt % or at least about 1.8 wt % or at least about 2 wt % or at least about 2.5 wt % or at least about 3 wt % or at least about 3.5 wt % or at least about 4 wt % or at least about 5 wt %, and not greater than about 30 wt % or not greater than about 26 wt % or not greater than about 24 wt % or not greater than about 20 wt % or not greater than about 18 wt % or not greater than about 16 wt %.

Item 5. The particulate material of item 1, wherein the body comprises a two-dimensional shape as viewed in a plane defined by a length and a width of the shaped abrasive particle selected from the group consisting of polygons, ellipsoids, numerals, Greek alphabet characters, Latin alphabet characters, Russian alphabet characters, complex shapes having a combination of polygonal shapes, and a combination thereof, wherein the body comprises a polygonal shape as viewed in a plane defined by the dimension of the length and width, wherein the shaped abrasive particle comprises a polygonal shape selected from the group consisting of triangle, rectangle, quadrilateral, pentagon, hexagon, heptagon, octagon, nonagon, decagon, and a combination thereof.

Item 6. The particulate material of item 1, wherein the body comprises a material selected from the group consisting of an oxide, a nitride, a carbide, a boride, an oxycarbide, oxynitride, and a combination thereof, wherein the body comprises alumina, wherein the body consists essentially of alumina.

Item 7. The particulate material of item 1, wherein the second dopant material comprises an element or compound including an element selected from the group consisting of alkali elements, alkaline earth elements, rare-earth elements, hafnium (Hf), zirconium (Zr), niobium (Nb), tantalum (Ta), molybdenum (Mo), vanadium (V), and a combination thereof, wherein the second dopant material comprises a material selected from the group consisting of lithium (Li), sodium (Na), potassium (K), magnesium (Mg), calcium (Ca), strontium (Sr), barium (Ba), scandium (Sc), yttrium (Y), lanthanum (La), cesium (Ce), praseodymium (Pr), niobium (Nb), hafnium (Hf), zirconium (Zr), tantalum (Ta), molybdenum (Mo), vanadium (V), and a combination thereof.

Item 8. The particulate material of item 1, wherein the first dopant material comprises an element or compound including an element selected from the group consisting of alkali elements, alkaline earth elements, rare-earth elements, hafnium (Hf), zirconium (Zr), niobium (Nb), tantalum (Ta), molybdenum (Mo), vanadium (V), and a combination thereof, wherein the first dopant material comprises a material selected from the group consisting of lithium (Li), sodium (Na), potassium (K), magnesium (Mg), calcium (Ca), strontium (Sr), barium (Ba), scandium (Sc), yttrium (Y), lanthanum (La), cesium (Ce), praseodymium (Pr), niobium (Nb), hafnium (Hf), zirconium (Zr), tantalum (Ta), molybdenum (Mo), vanadium (V), and a combination thereof.

Item 9. The particulate material of item 1, wherein the body comprises not greater than about 12 wt % of the first dopant material for the total weight of the body, wherein the body comprises not greater than about 11 wt % or not greater than about 10 wt % or not greater than about 9 wt % or not greater than about 8 wt % or not greater than about 7 wt % or not greater than about 6 wt %, and at least about 0.5 wt % or at least about 1 wt % or at least about 1.3 wt % or at least about 1.8 wt % or at least about 2 wt % or at least about 2.3 wt % or at least about 2.8 wt % or at least about 3 wt %.

Item 10. The particulate material of item 1, wherein the body comprises not greater than about 12 wt % of the second dopant material for the total weight of the body, wherein the body comprises not greater than about 11 wt % or not greater than about 10 wt % or not greater than about 9 wt % or not greater than about 8 wt % or not greater than about 7 wt % or not greater than about 6 wt %, and at least about 0.5 wt % or at least about 1 wt % or at least about 1.3 wt % or at least about 1.8 wt % or at least about 2 wt % or at least about 2.3 wt % or at least about 2.8 wt % or at least about 3 wt %.

Item 11. The particulate material of item 1, wherein the body comprises a primary aspect ratio defined by a ratio of length:width of at least about 1.2:1 or at least about 1.5:1 or at least about 2:1 or at least about 3:1 or at least about 4:1.23

Item 12. The particulate material of item 1, wherein the body comprises a secondary aspect ratio defined by a ratio of length:thickness of at least about 1.2:1 or at least about 1.5:1 or at least about 2:1 or at least about 3:1 or at least about 4:1 or at least about 5:1 or at least about 10:1.

Item 13. The particulate material of item 1, wherein the body comprises a tertiary aspect ratio defined by a ratio of width:thickness of at least about 1.2:1 or at least about 1.5:1 or at least about 2:1 or at least about 3:1 or at least about 4:1 or at least about 5:1 or at least about 10:1.

Item 14. The particulate material of item 1, wherein the body comprises a greater thickness at a midpoint of the body than a thickness at a corner of the body, wherein the body comprises a corner/midpoint differential thickness of at least 1.1.

Item 15. The particulate material of item 1, wherein the body comprises a greater thickness at a corner of the body than at a midpoint of the body, wherein the body comprises a greater thickness at an edge of the body than at a midpoint of the body.

Item 16. The particulate material of item 1, wherein upper surface has an upper surface contour significantly different than a contour of a bottom surface of the body as viewed in a cross-section of the body in a plane defined by the thickness and the length, wherein the upper surface comprises a two-dimensional shape as viewed in a plane defined by the length and width of the body that is significantly different than a two-dimensional shape of the bottom surface of the body as viewed in a plane defined by the length and width.

Item 17. The particulate material of item 1, wherein the body comprises a greater thickness at a midpoint of the body than a thickness at a midpoint edge of the body, wherein the body comprises an edge/midpoint differential thickness of at least 1.1, wherein edge/midpoint differential thickness (e/mot) is a measure of a midpoint thickness (tm) divided by an average edge thickness (te).

Item 18. The particulate material of item 1, wherein the body comprises a corner-truncated polygonal shape including a first long side, a second long side, and a first short side disposed between the first long side and second long side, wherein the first short side comprises a length shorter than the first long side and shorter than the second long side, wherein the body has a first angle between the first short side and the first long side greater than 90°, wherein the body comprises a corner-truncated triangle shape, wherein the body comprises a corner truncated quadrilateral shape.

Item 19. The particulate material of item 18, wherein the first short side comprises a length of not greater than about 60% of a length of the first long side or not greater than about 50% or not greater than about 40% or not greater than about 30% or not greater than about 20%, and wherein the first short side comprises a length of at least about 2% of a length of the first long side.

Item 20. The particulate material of item 18, wherein the first long side comprises a first length (l1) that is at least equal to a second length (l2) of the second long side, wherein the body further comprises a third long side, wherein the third long side has a length (l3) that is at least equal to a first length (l1) of the first long side.

Item 21. The particulate material of item 18, wherein the first angle is at least about 92°, wherein the first angle is at least about 95° or at least about 100° or at least about 105°, and not greater than about 160°.

Item 22. The particulate material of item 18, wherein the body further comprises a second short side between the first long side and third long side, further comprising a second angle between the second short side and the first long side greater than about 90°, wherein the second angle is at least about 95° or at least about 100° or at least about 105°, and not greater than about 160°.

Item 23. The particulate material of item 1, wherein the body comprises at least one exterior surface comprising a texture different than a texture on another exterior surface of the body, the at least one exterior surface is the upper surface, wherein the at least one exterior surface is a bottom surface of the body, wherein the body comprises a plurality of exterior surfaces comprising a texture.

Item 24. The particulate material of item 1, wherein the body comprises a pattern of features on at least one exterior surface, wherein the features are selected from the group consisting of protrusions, grooves, ridges, scales, and a combination thereof, wherein the body comprises at least one exterior surface comprising a pattern of protrusions and grooves, wherein the body comprises a plurality of grooves on at least one exterior surface, wherein the plurality of grooves have significantly different widths with respect to each other, wherein the plurality of grooves have significantly different contours with respect to each other, wherein the grooves are curved.

Item 25. The particulate material of item 1, wherein the body comprises at least one exterior surface having a patterned surface defined by a regular and repeating array of features, wherein the body comprises at least one exterior surface having a patterned surface defined by an irregular arrangement of features.

Item 26. The particulate material of item 1, wherein the body comprises a dopant material at an exterior surface of the body comprising a texture, wherein the dopant material complements the texture on the exterior surface, wherein the dopant material comprises a first concentration at a first feature and a second concentration at a second feature, wherein the first feature and the second feature are different, wherein the first concentration and second concentration are different from each other, wherein the first feature comprises a groove, wherein the second feature comprises a protrusion, wherein the dopant material forms a pattern on the exterior surface, wherein the first concentration is greater than the second concentration, wherein the first concentration is less than the first concentration.

Item 27. The particulate material of item 1, wherein the body comprises a length of less than about 5 mm, wherein the body comprises a length of at least about 1 micron.

Item 28. A method of forming a shaped abrasive particle comprising:
extruding a mixture into a form;
applying a dopant material to an exterior surface of the form; and
forming a precursor shaped abrasive particle from the form.

Item 29. The method of item 28, wherein applying the dopant material includes a process selected from the group of processes including spraying, dipping, depositing, impregnating, transferring, punching, cutting, pressing, crushing and a combination thereof.

Item 30. The method of item 28, wherein the exterior surface is selected from the group consisting of an upper surface, a bottom surface, a side surface, and a combination thereof, wherein applying the dopant material comprises applying the dopant material to an upper surface of the form, wherein applying the dopant material comprises applying the dopant material to a bottom surface of the form, wherein applying the dopant material comprises spraying the dopant material on an upper surface of the form.

Item 31. The method of item 28, wherein applying the dopant material is conducted before forming the precursor shaped abrasive particle, wherein applying the dopant material is conducted simultaneously with forming the precursor shaped abrasive particle, wherein applying the dopant material is conducted after forming the precursor shaped abrasive particle.

Item 32. The method of item 28, wherein applying the dopant material includes applying the dopant material to a surface of a tool used to conduct the forming process, wherein the dopant material is disposed on a surface of a sectioning device used to form the precursor shaped abrasive particle.

Item 33. The method of item 28, wherein the dopant material comprises a precursor salt, wherein the salt comprises nitrogen, wherein the salt comprises a nitrate, chloride, sulfate, phosphate wherein the dopant material comprises an element or compound including an element selected from the group consisting of alkali elements, alkaline earth elements, rare-earth elements, hafnium (Hf), zirconium (Zr), niobium (Nb), tantalum (Ta), molybdenum (Mo), vanadium (V), and a combination thereof, wherein the dopant material comprises an element or compound including an element selected from the group consisting of lithium (Li), sodium (Na), potassium (K), magnesium (Mg), calcium (Ca), strontium (Sr), barium (Ba), scandium (Sc), yttrium (Y), lanthanum (La), cesium (Ce), praseodymium (Pr), niobium (Nb), hafnium (Hf), zirconium (Zr), tantalum (Ta), molybdenum (Mo), vanadium (V), and a combination thereof.

Item 34. The method of item 28, wherein extruding comprises pressing the mixture and forcing it through a die opening, wherein pressing includes applying a pressure of at least about 10 kPa, at least about 500 kPa, and not greater than about 4 MPa Item 35. The method of item 34, wherein the die opening has a rectangular shape, wherein the form has a cross-sectional shape essentially the same as the shape of the die opening.

Item 36. The method of item 28, wherein extruding comprises extruding the mixture onto a belt, wherein the mixture contacts a surface of the belt after being extruded through a die opening, wherein the belt is translated while extruding, wherein the mixture is translated on the belt after exiting the die opening.

Item 37. The method of item 28, wherein the mixture comprises not greater than about 30 wt % organic materials for the total weight of the mixture, wherein the mixture comprises at least about 0.5 vol % organic material for the total volume of the mixture.

Item 38. The method of item 28, wherein the mixture comprises a ceramic material selected from the group consisting of an oxide, a nitride, a carbide, a boride, an oxycarbide, oxynitride, and a combination thereof, wherein the ceramic material comprises alumina, wherein the ceramic material comprises boehmite.

Item 39. The method of item 28, wherein the mixture has a storage modulus of at least about $1\times10^4$ Pa, wherein the mixture has a viscosity of not greater than about $1\times10^7$ Pa.

Item 40. The method of item 28, wherein the mixture comprises a solids content of at least about 25 wt % for the total weight of the mixture, a solids content of not greater than about 75 wt %.

Item 41. The method of item 28, wherein the mixture comprises a liquid content of at least about 25 wt % for the total weight of the mixture, a liquid content of not greater than about 75 wt %.

Item 42. The method of item 28, wherein the mixture comprises a ceramic powder material and a liquid, wherein mixture comprises a gel, wherein the gel is a shape-stable material, wherein the gel comprises a ceramic powder material as an integrated network of discrete particles.

Item 43. The method of item 28, wherein extruding comprises extruding a form having a length (l), a width (w), and a thickness (t), wherein the length≥width≥thickness, wherein the form comprises a sheet, wherein the form comprises an average thickness of at least about 0.1 mm, wherein the form comprises an average thickness of not greater than about 10 mm.

Item 44. The method of item 43, wherein forming comprises sectioning the sheet, wherein forming comprises perforating a portion of the form, wherein sectioning comprises a process selected from the group consisting of cutting, pressing, punching, crushing, and a combination thereof, wherein cutting comprises water-jet cutting, wherein cutting comprises use of a blade, wherein sectioning comprises use of radiation, wherein sectioning comprises use of a laser.

Item 45. The method of item 44, wherein sectioning comprises translating at least one blade through the sheet, wherein sectioning comprises translating at least one blade through the sheet in a first direction and a second direction, wherein sectioning includes forming a plurality of shaped abrasive particles from the sheet.

Item 46. The method of item 44, further comprising shaping a surface of the sheet, wherein shaping comprises altering a contour of at least one surface of the sheet, wherein shaping comprises a process selected from the group consisting of embossing, rolling, cutting, engraving, patterning, and a combination thereof.

Item 47. The method of item 46, wherein shaping is conducted prior to a drying process, wherein shaping is completed prior to the forming process, wherein shaping is completed during the forming process, wherein shaping is completed after the forming process.

Item 48. The method of item 28, wherein extruding further comprises a screen-printing process, wherein extruding comprises forcing a portion of the mixture through an opening in a screen after exiting a die opening, wherein the opening has a two-dimensional shape as viewed in a plane defined by a length and a width of the screen selected from the group consisting of polygons, ellipsoids, numerals, Greek alphabet characters, Latin alphabet characters, Russian alphabet characters, complex shapes having a combination of polygonal shapes, and a combination thereof, wherein the opening comprises a polygonal shape as viewed in a plane defined by the dimension of the length and width of the screen, wherein the opening comprises a polygonal shape selected from the group consisting of triangle, rectangle, quadrilateral, pentagon, hexagon, heptagon, octagon, nonagon, decagon, and a combination thereof.

Item 49. The method of item 48, wherein the screen comprises a plurality of openings, wherein screen printing comprises forming a plurality of discrete precursor shaped abrasive particles.

Item 50. The method of item 48, wherein the form has a two-dimensional shape corresponding to the two-dimensional shape of the opening, wherein forming the precursor shaped abrasive particle is conducted by forcing a portion of the mixture through the opening in the screen, wherein forming the precursor shaped abrasive particle is conducted prior to applying a dopant material, wherein extruding and forming are conducted substantially simultaneously.

Item 51. The method of item 50, further comprising translating a shaped abrasive particle along a belt, further comprising spraying the shaped abrasive particle with the dopant material.

Item 52. The method of item 28, further comprising sintering to form a sintered shaped abrasive particle, wherein sintering includes a densifying the shaped abrasive particle.

Item 53. A particulate material comprising:
a shaped abrasive particle having a body comprising a length (l), a width, (w), and a thickness (t), wherein the body comprises:
a first exterior surface having a first dopant amount ($D_{1c}$) of a first dopant material;
a second exterior surface spaced apart from the first exterior surface by at least one edge, the second exterior surface having a second dopant amount ($D_{2c}$) of a second dopant material; and
wherein the body comprises a dopant amount difference ($\Delta D_c$) between the first dopant amount and the second dopant amount.

Item 54. The particulate material of item 53, wherein the first dopant material and the second dopant material are different materials, wherein one of the first dopant material and the second dopant material comprises an element or compound including an element selected from the group consisting of alkali elements, alkaline earth elements, rare-earth elements, hafnium (Hf), zirconium (Zr), niobium (Nb), tantalum (Ta), molybdenum (Mo), vanadium (V), and a combination thereof, wherein one of the first dopant material and the second dopant material comprises an element or compound including an element selected from the group consisting of lithium (Li), sodium (Na), potassium (K), magnesium (Mg), calcium (Ca), strontium (Sr), barium (Ba), scandium (Sc), yttrium (Y), lanthanum (La), cesium (Ce), praseodymium (Pr), niobium (Nb), hafnium (Hf), zirconium (Zr), tantalum (Ta), molybdenum (Mo), vanadium (V), and a combination thereof.

Item 55. The particulate material of item 53, wherein the body comprises two-dimensional shape as viewed in a plane defined by a length and a width of the body selected from the group consisting of polygons, ellipsoids, numerals, Greek alphabet characters, Latin alphabet characters, Russian alphabet characters, complex shapes having a combination of polygonal shapes, and a combination thereof, wherein the body comprises a polygonal shape as viewed in a plane defined by the dimension of the length and width of the screen, wherein the body comprises a polygonal shape selected from the group consisting of triangle, rectangle, quadrilateral, pentagon, hexagon, heptagon, octagon, nonagon, decagon, and a combination thereof.

Item 56. The particulate material of item 53, wherein the dopant amount difference ($\Delta D_c$) is at least about 0.2 wt % or at least about 0.6 wt % or at least about 1 wt % or at least about 1.4 wt % or at least about 1.8 wt % or at least about 2 wt % or at least about 2.5 wt % or at least about 3 wt % or at least about 3.5 wt % or at least about 4 wt % or at least about 5 wt %, and not greater than about 30 wt % or not greater than about 26 wt % or not greater than about 24 wt % or not greater than about 20 wt % or not greater than about 18 wt % or not greater than about 16 wt %.

Item 57. The particulate material of item 53, wherein the first dopant amount is not greater than about 12 wt % of the first dopant material for the total weight of the body, wherein the body comprises not greater than about 11 wt % or not greater than about 10 wt % or not greater than about 9 wt % or not greater than about 8 wt % or not greater than about 7 wt % or not greater than about 6 wt %, and at least about 0.5 wt % or at least about 1 wt % or at least about 1.3 wt % or at least about 1.8 wt % or at least about 2 wt % or at least about 2.3 wt % or at least about 2.8 wt % or at least about 3 wt %.

Item 58. The particulate material of item 53, wherein the second dopant amount is not greater than about 12 wt % of the second dopant material for the total weight of the body, wherein the body comprises not greater than about 11 wt % or not greater than about 10 wt % or not greater than about 9 wt % or not greater than about 8 wt % or not greater than about 7 wt % or not greater than about 6 wt %, and at least about 0.5 wt % or at least about 1 wt % or at least about 1.3 wt % or at least about 1.8 wt % or at least about 2 wt % or at least about 2.3 wt % or at least about 2.8 wt % or at least about 3 wt %.

Item 59. The particulate material of item 53, wherein the first exterior surface comprises an upper surface defined by dimensions of the length and width, wherein the first exterior surface comprises a side surface extending from an upper surface or side surface, wherein the first exterior surface comprises a bottom surface opposite the upper surface and separated from the upper surface by at least one side surface.

Item 60. The particulate material of item 53, wherein the second exterior surface comprises an upper surface defined by dimensions of the length and width, wherein the second exterior surface comprises a side surface extending from an upper surface or side surface, wherein the second exterior surface comprises a bottom surface opposite the upper surface and separated from the upper surface by at least one side surface.

Item 61. The particulate material of item 53, further comprising an edge extending between two of the exterior surfaces, the edge comprising a third dopant material present in a third dopant amount, wherein the third dopant amount is different than the first dopant amount, wherein the third dopant amount is different than the second dopant amount, wherein the third dopant material is different than the first dopant material, wherein the third dopant material is different than the second dopant material.

Item 62. The particulate material of item 53, further comprising:
an upper surface defined by dimensions of the length and width, the upper surface having a first dopant material present in a first dopant amount;
a side surface extending from the upper surface and defining the thickness of the body, the side surface comprising a second dopant material present in the second dopant amount;
an edge extending between the side surface and upper surface, the edge comprising a third dopant material present in a third dopant amount; and
a bottom surface opposite the upper surface and separated from the upper surface by the side surface, the bottom surface having a fourth dopant material present in a fourth dopant amount.

Item 63. The particulate material of item 62, wherein at least two of the dopant materials of the group consisting of the first dopant material, second dopant material, third dopant material, and fourth dopant material are different from each other, wherein at least two of the dopant material amounts of the group consisting of the first dopant material amount, second dopant material amount, third dopant material amount, and fourth dopant material amount are different from each other.

Item 64. A particulate material comprising
a shaped abrasive particle having a body comprising a length, a width, and a height, wherein the body comprises an upper surface defined by dimensions of the length and width, the upper surface having a dopant material forming a pattern on the upper surface.

Item 65. A particulate material comprising:
a shaped abrasive particle having a body comprising a length, a width, and a thickness, wherein the body comprises a central region including the geometric center of the body having a first microstructure, the body further comprising an upper surface defined by the dimensions of length and width, the upper surface having a second microstructure, wherein the first microstructure is different from the second microstructure.

The present application represents a departure from the state of the art. While the industry has recognized that shaped abrasive particles may be formed through processes such as molding and screen printing, the processes of the embodiments herein are distinct from such processes. Notably, the embodiments herein include a combination of process features facilitating the formation of batches of shaped abrasive particle having particular features. Moreover, the shaped abrasive particles of the embodiments herein can have a particular combination of features distinct from other particles including, but not limited to, aspect ratio, composition, additives, two-dimensional shape, three-dimensional shape, and a combination thereof. And in fact, such compositions may facilitate improved grinding performance in the context of fixed abrasives, such as bonded abrasives or coated abrasives.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. A particulate material comprising:
a shaped abrasive particle having a body comprising a length (l), a width, (w), and a thickness (t), wherein the body comprises an upper surface, a bottom surface, and a side surface extending between the upper surface and the bottom surface;
wherein the body further comprises a first exterior surface having a first dopant amount (D1c) of a first dopant material;
a second exterior surface spaced apart from the first exterior surface by at least one edge, the second exterior surface having a second dopant amount (D2c) of a second dopant material;
a dopant amount difference (ΔDc) between the first dopant amount and the second dopant amount;
wherein a geometric center of the body is essentially free of a dopant material; and at least one of the upper surface, bottom surface, or the side surface is essentially free of a dopant material.

2. The particulate material of claim 1, wherein the first dopant material and second dopant material are different from each other.

3. The particulate material of claim 1, wherein the body comprises a material selected from the group consisting of an oxide, a nitride, a carbide, a boride, an oxycarbide, an oxynitride, or any combination thereof.

4. The particulate material of claim 1, wherein the shaped abrasive particle comprises alpha alumina.

5. The particulate material of claim 4, wherein the shaped abrasive particle comprises at least about 90 wt % alpha alumina.

6. The particulate material of claim 4, wherein the alpha alumina has an average grain size of at least 0.01 microns and not greater than about 1 micron.

7. The particulate material of claim 1, wherein at least one of the first dopant material and the second dopant material comprises an element or compound including an element selected from the group consisting of alkali elements, alkaline earth elements, rare-earth elements, hafnium (Hf), zirconium (Zr), niobium (Nb), tantalum (Ta), molybdenum (Mo), vanadium (V), and a combination thereof.

8. The particulate material of claim 1, wherein the dopant amount difference (ΔDc) is at least about 0.2 wt % and not greater than about 30 wt %.

9. The particulate material of claim 1, wherein the dopant amount difference (ΔDc) is at least about 2 wt % and not greater than about 16 wt %.

10. The particulate material of claim 1, wherein the first dopant amount is present in an amount of at least about 0.2 wt % and not greater than about 12 wt % for the total weight of the body.

11. The particulate material of claim 1, wherein the second dopant amount is present in an amount of at least about 0.2 wt % and not greater than about 12 wt % for the total weight of the body.

12. The particulate material of claim 1, wherein the body comprises a two-dimensional shape as viewed in a plane defined by a length and a width of the shaped abrasive particle selected from the group consisting of polygons, ellipsoids, numerals, Greek alphabet characters, Latin alphabet characters, Russian alphabet characters, complex shapes having a combination of polygonal shapes, and a combination thereof.

13. The particulate material of claim 1, wherein the first exterior surface comprises the upper surface defined by dimensions of the length and width.

14. The particulate material of claim 1, wherein the second exterior surface comprises the bottom surface opposite the upper surface and separated from the upper surface by at least one side surface.

15. The particulate material of claim 1, wherein the upper surface has an upper surface contour significantly different than a contour of a bottom surface of the body as viewed in a cross-section of the body in a plane defined by the thickness and the length.

16. The particulate material of claim 1, wherein the body comprises a triangular two-dimensional shape as viewed in a plane defined by the length and width.

17. The particulate material of claim 1, wherein the body comprises a pattern of features on at least one exterior surface, and wherein the features are selected from the group consisting of protrusions, grooves, ridges, scales, and a combination thereof.

18. The particulate material of claim 17, wherein the body comprises a side surface including a plurality of ridges.

19. The particulate material of claim 1, further comprising an edge extending between two of the exterior surfaces, the edge comprising a third dopant material present in a third dopant amount, wherein the third dopant amount is different than at least one of the first dopant amount and the second dopant amount.

20. The particulate material of claim 1, further comprising:
- the upper surface defined by dimensions of the length and width, the upper surface having a first dopant material present in a first dopant amount;
- the side surface extending from the upper surface and defining the thickness of the body, the side surface comprising a second dopant material present in the second dopant amount.

* * * * *

UNITED STATES PATENT AND TRADEMARK OFFICE
CERTIFICATE OF CORRECTION

PATENT NO. : 10,597,568 B2
APPLICATION NO. : 15/686674
DATED : March 24, 2020
INVENTOR(S) : Yener et al.

It is certified that error appears in the above-identified patent and that said Letters Patent is hereby corrected as shown below:

In the Specification

Column 21, Line 14, please delete "(c/mot)", and insert --(c/m$\Delta$t)--

Column 28, Line 11, please delete "(e/mot)", and insert --(e/m$\Delta$t)--

Signed and Sealed this
Nineteenth Day of April, 2022

Katherine Kelly Vidal
*Director of the United States Patent and Trademark Office*